(12) United States Patent
Roy et al.

(10) Patent No.: US 7,494,732 B2
(45) Date of Patent: Feb. 24, 2009

(54) FUEL CELL DEVICE WITH VARIED ACTIVE AREA SIZES

(75) Inventors: Shantanu Roy, New Delhi (IN);
Thomas D Ketcham, Big Flats, NY (US); Dell J St Julien, Watkins Glen, NY (US); Jacqueline L Brown, Lindley, NY (US); Michael E Badding, Campbell, NY (US)

(73) Assignee: Corning Incorporated, Corning, NY (US)

( * ) Notice: Subject to any disclaimer, the term of this patent is extended or adjusted under 35 U.S.C. 154(b) by 510 days.

(21) Appl. No.: 11/095,325

(22) Filed: Mar. 29, 2005

(65) Prior Publication Data

US 2005/0221131 A1    Oct. 6, 2005

Related U.S. Application Data

(60) Provisional application No. 60/558,166, filed on Mar. 31, 2004.

(51) Int. Cl.
*H01M 8/10* (2006.01)
*H01M 4/00* (2006.01)

(52) U.S. Cl. .............................. 429/32; 429/28; 429/36

(58) Field of Classification Search .................. 429/26, 429/38, 32
See application file for complete search history.

(56) References Cited

U.S. PATENT DOCUMENTS

| 5,273,837 A | 12/1993 | Aitken et al. .................. 429/30 |
| 6,623,881 B2 | 9/2003 | Badding et al. ............... 429/30 |
| 2001/0044041 A1 * | 11/2001 | Badding et al. ............... 429/32 |
| 2002/0102450 A1 | 8/2002 | Badding et al. ............... 429/32 |

FOREIGN PATENT DOCUMENTS

| JP | 05006771 | 1/1993 |
| JP | 2001068139 | 3/2001 |
| JP | 2001068139 A * | 3/2001 |
| WO | WO2006/019419 | 2/2006 |

OTHER PUBLICATIONS

IPDL Machine Translation and Abstract in English of JP 2001-068139.*

* cited by examiner

*Primary Examiner*—Alexa D Neckel
*Assistant Examiner*—Claire L Rademaker
(74) *Attorney, Agent, or Firm*—Svetlana Z. Short

(57) ABSTRACT

According to one aspect of the invention a fuel cell device comprises: a plurality of fuel cells, each of the plurality of fuel cells having an active area, wherein at least two of the plurality of fuel cells have differently sized active area, such that ratio of the active areas of these two fuel cells is at least 1.1:1.

20 Claims, 29 Drawing Sheets

25, 24, 26          25, 24, 26 cell #1  cell #3  cell #10
  cell #2 a.
25, 24 b.
25, 24

FIG. 21C

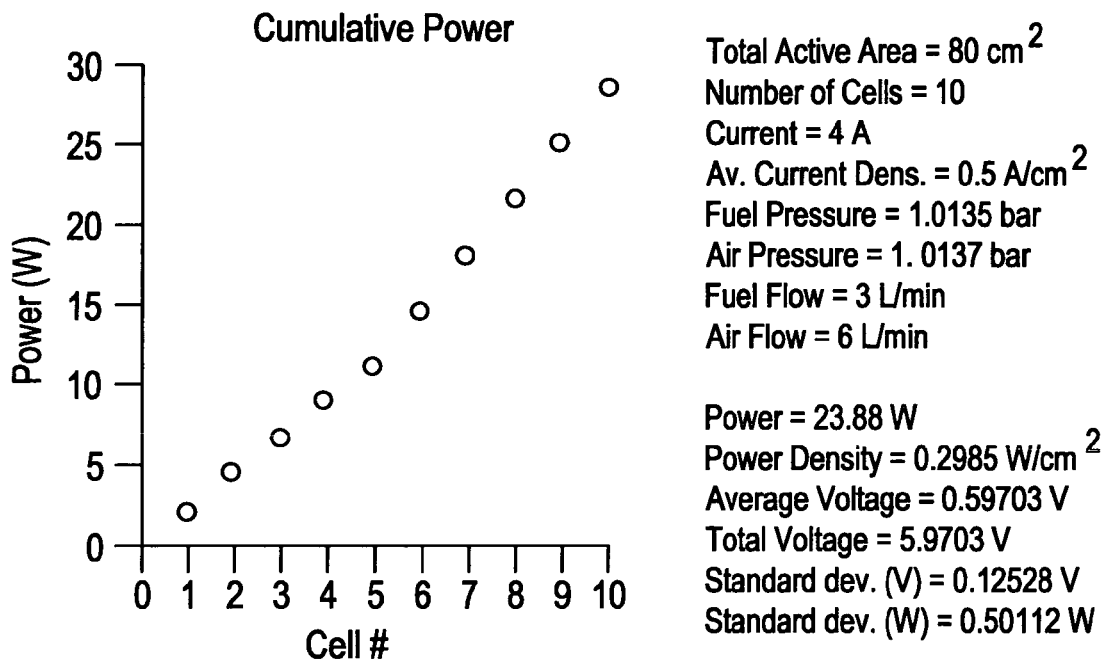

Total Active Area = 80 cm$^2$
Number of Cells = 10
Current = 4 A
Av. Current Dens. = 0.5 A/cm$^2$
Fuel Pressure = 1.0135 bar
Air Pressure = 1. 0137 bar
Fuel Flow = 3 L/min
Air Flow = 6 L/min Power = 23.88 W
Power Density = 0.2985 W/cm$^2$
Average Voltage = 0.59703 V
Total Voltage = 5.9703 V
Standard dev. (V) = 0.12528 V
Standard dev. (W) = 0.50112 W

FIG. 21D

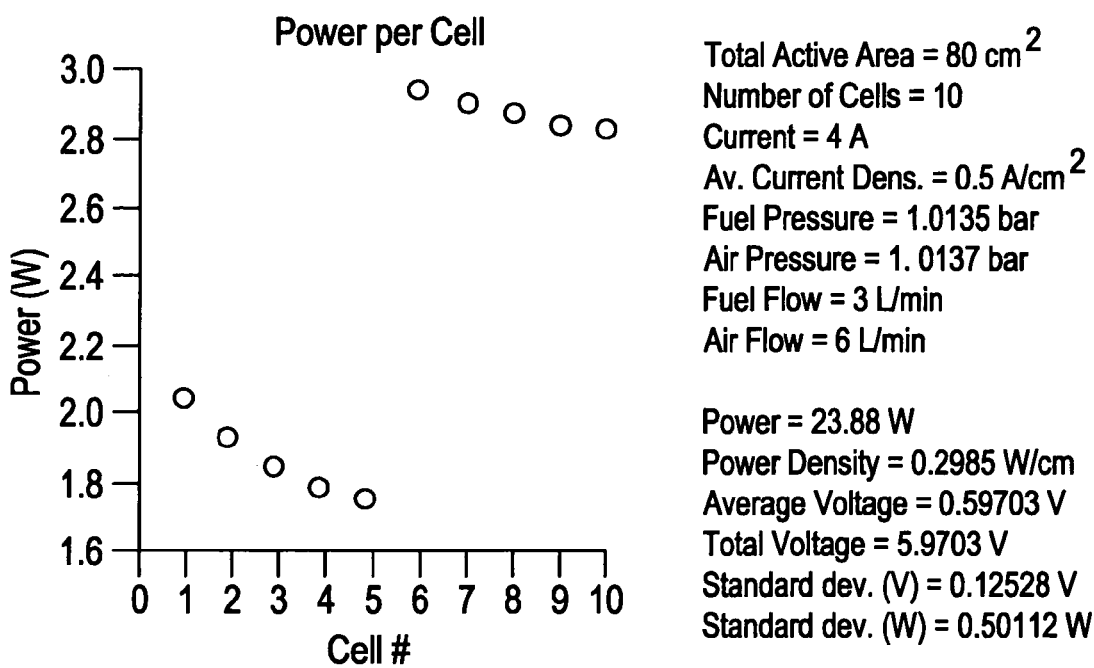

Total Active Area = 80 cm$^2$
Number of Cells = 10
Current = 4 A
Av. Current Dens. = 0.5 A/cm$^2$
Fuel Pressure = 1.0135 bar
Air Pressure = 1. 0137 bar
Fuel Flow = 3 L/min
Air Flow = 6 L/min Power = 23.88 W
Power Density = 0.2985 W/cm
Average Voltage = 0.59703 V
Total Voltage = 5.9703 V
Standard dev. (V) = 0.12528 V
Standard dev. (W) = 0.50112 W

FIG. 22E

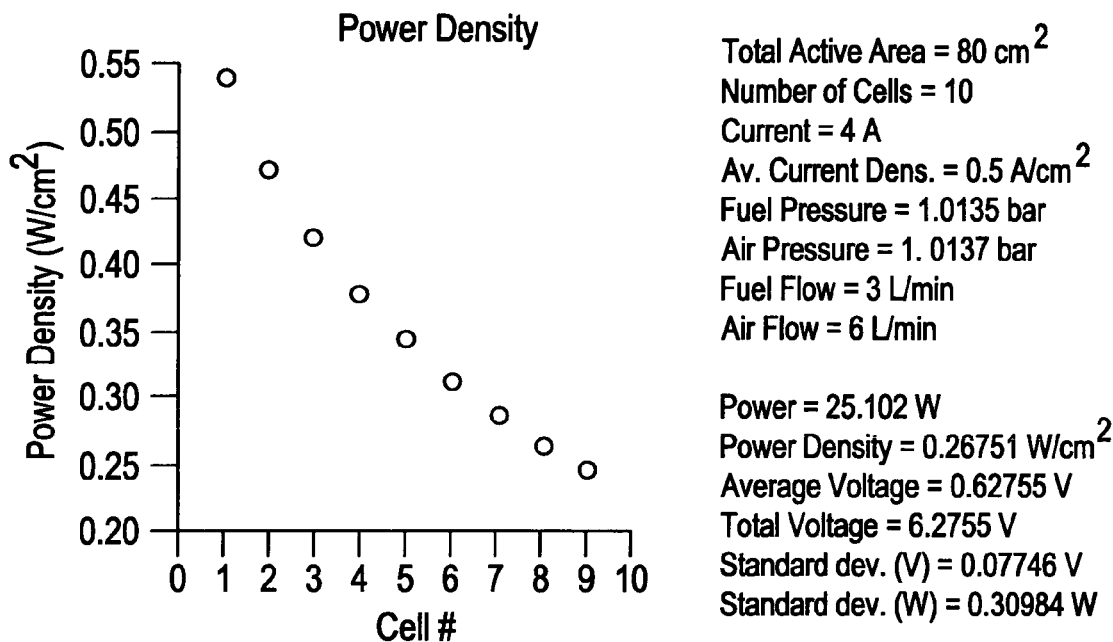

Total Active Area = 80 $cm^2$
Number of Cells = 10
Current = 4 A
Av. Current Dens. = 0.5 $A/cm^2$
Fuel Pressure = 1.0135 bar
Air Pressure = 1. 0137 bar
Fuel Flow = 3 L/min
Air Flow = 6 L/min Power = 25.102 W
Power Density = 0.26751 $W/cm^2$
Average Voltage = 0.62755 V
Total Voltage = 6.2755 V
Standard dev. (V) = 0.07746 V
Standard dev. (W) = 0.30984 W

FIG. 22F

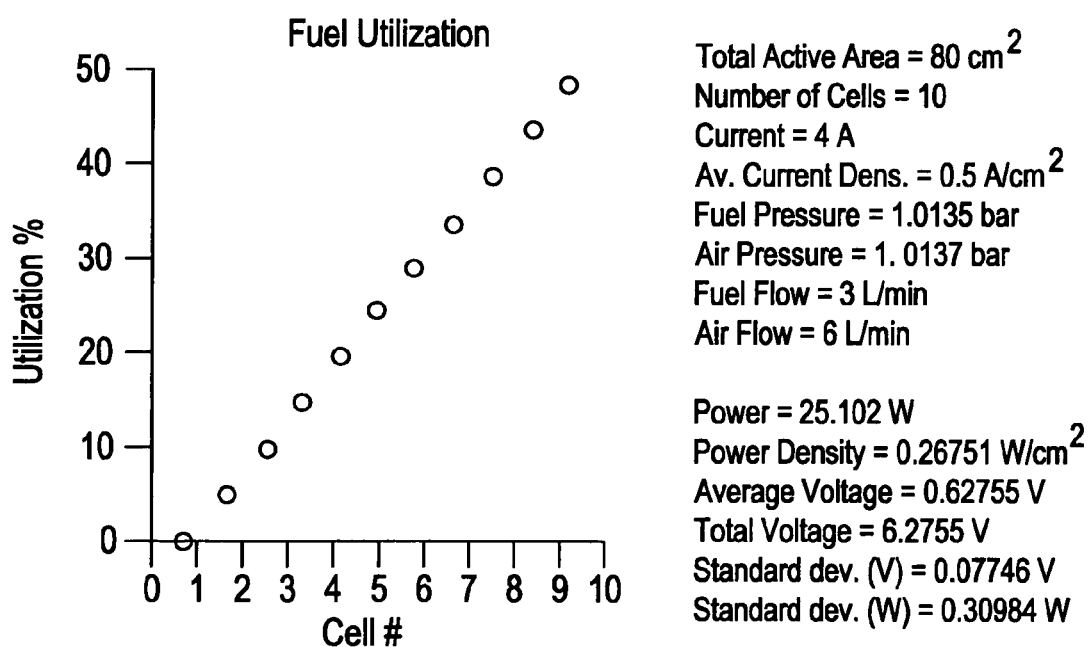

Total Active Area = 80 $cm^2$
Number of Cells = 10
Current = 4 A
Av. Current Dens. = 0.5 $A/cm^2$
Fuel Pressure = 1.0135 bar
Air Pressure = 1. 0137 bar
Fuel Flow = 3 L/min
Air Flow = 6 L/min Power = 25.102 W
Power Density = 0.26751 $W/cm^2$
Average Voltage = 0.62755 V
Total Voltage = 6.2755 V
Standard dev. (V) = 0.07746 V
Standard dev. (W) = 0.30984 W

FIG. 23A

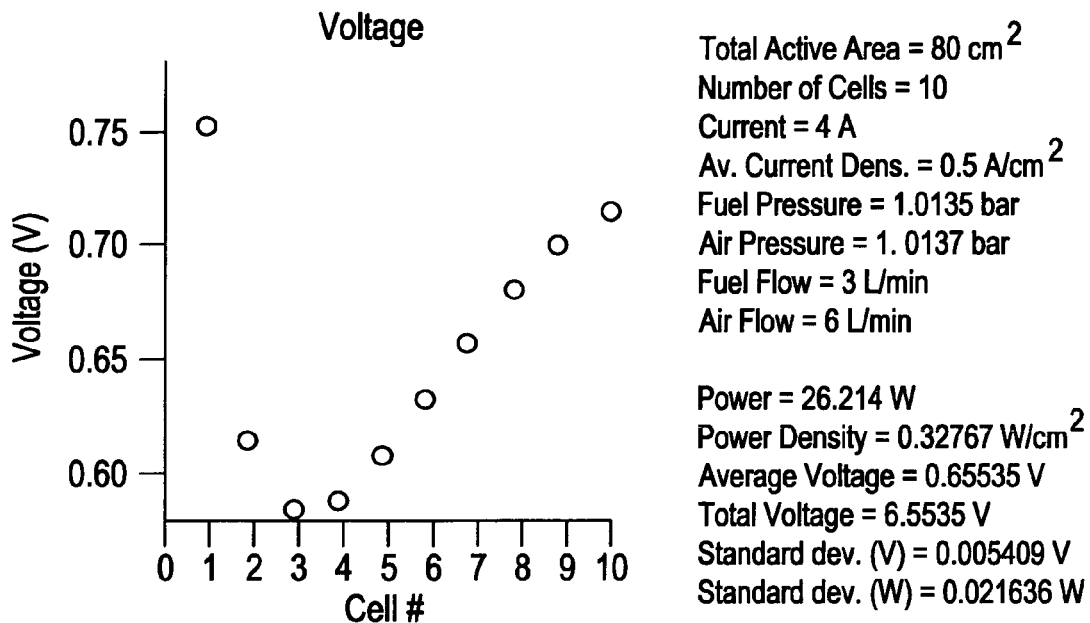

Total Active Area = 80 cm$^2$
Number of Cells = 10
Current = 4 A
Av. Current Dens. = 0.5 A/cm$^2$
Fuel Pressure = 1.0135 bar
Air Pressure = 1. 0137 bar
Fuel Flow = 3 L/min
Air Flow = 6 L/min Power = 26.214 W
Power Density = 0.32767 W/cm$^2$
Average Voltage = 0.65535 V
Total Voltage = 6.5535 V
Standard dev. (V) = 0.005409 V
Standard dev. (W) = 0.021636 W

FIG. 23B

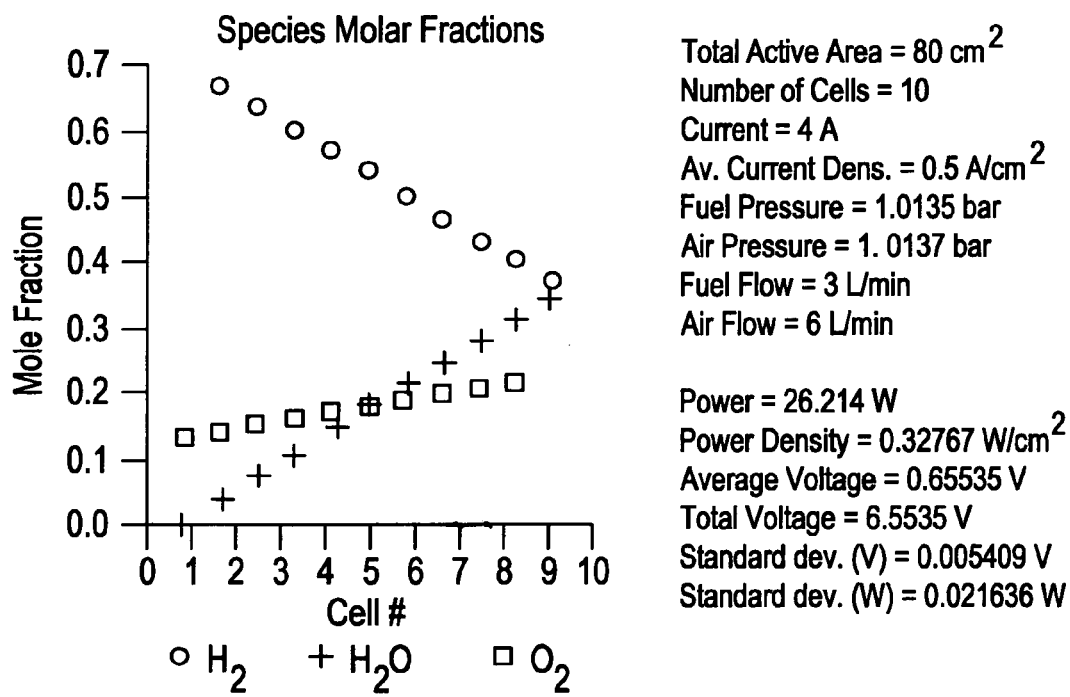

○ $H_2$    + $H_2O$    □ $O_2$

Total Active Area = 80 cm$^2$
Number of Cells = 10
Current = 4 A
Av. Current Dens. = 0.5 A/cm$^2$
Fuel Pressure = 1.0135 bar
Air Pressure = 1. 0137 bar
Fuel Flow = 3 L/min
Air Flow = 6 L/min Power = 26.214 W
Power Density = 0.32767 W/cm$^2$
Average Voltage = 0.65535 V
Total Voltage = 6.5535 V
Standard dev. (V) = 0.005409 V
Standard dev. (W) = 0.021636 W

FIG. 23E

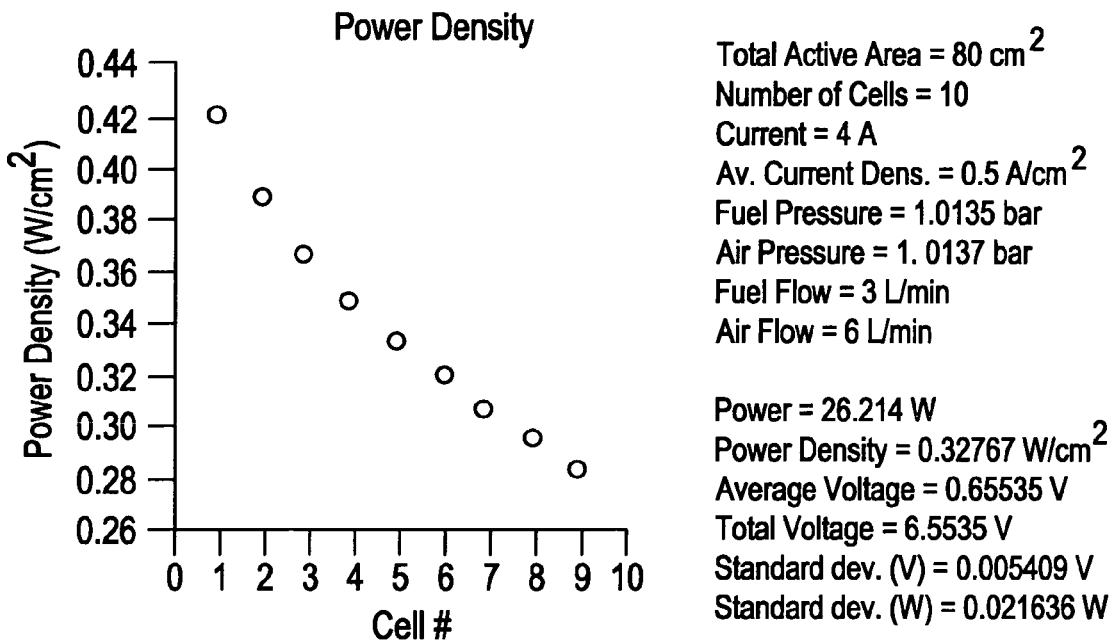

Total Active Area = 80 cm$^2$
Number of Cells = 10
Current = 4 A
Av. Current Dens. = 0.5 A/cm$^2$
Fuel Pressure = 1.0135 bar
Air Pressure = 1. 0137 bar
Fuel Flow = 3 L/min
Air Flow = 6 L/min Power = 26.214 W
Power Density = 0.32767 W/cm$^2$
Average Voltage = 0.65535 V
Total Voltage = 6.5535 V
Standard dev. (V) = 0.005409 V
Standard dev. (W) = 0.021636 W

FIG. 23F

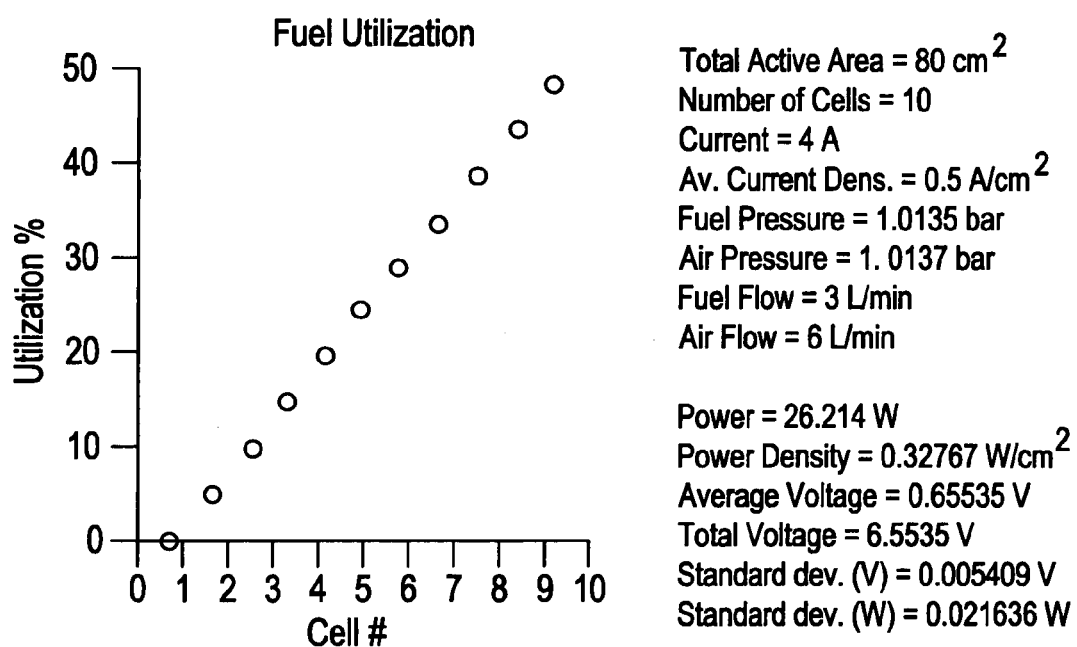

Total Active Area = 80 cm$^2$
Number of Cells = 10
Current = 4 A
Av. Current Dens. = 0.5 A/cm$^2$
Fuel Pressure = 1.0135 bar
Air Pressure = 1. 0137 bar
Fuel Flow = 3 L/min
Air Flow = 6 L/min Power = 26.214 W
Power Density = 0.32767 W/cm$^2$
Average Voltage = 0.65535 V
Total Voltage = 6.5535 V
Standard dev. (V) = 0.005409 V
Standard dev. (W) = 0.021636 W

FUEL CELL DEVICE WITH VARIED ACTIVE AREA SIZES

This application claims the benefit of U.S. Provisional Application Ser. No. 60/558,166, filed Mar. 31, 2004, entitled Fuel Cell Device with Varied Active Area Sizes.

BACKGROUND OF THE INVENTION

1. Field of the Invention

The present invention relates generally to fuel cell devices with multiple fuel cells, and particularly to optimizing the size of the fuel cells based on their position.

2. Technical Background

The use of solid oxide fuel cells has been the subject of considerable amount of research in recent years. The typical components of a solid oxide fuel cell (SOFC) comprise a negatively-charged oxygen-ion conducting electrolyte sandwiched between two electrodes. Electrical current is generated in such cells by oxidation, at the anode, of a fuel material, which reacts with oxygen ions conducted through the electrolyte. Oxygen ions are formed by reduction of molecular oxygen at the cathode.

It is known that that at sufficient temperatures (e.g., about 600° C. and above), yttria stabilized zirconia YSZ ($Y_2O_3$—$ZrO_2$) electrolytes exhibit good ionic conductance and very low electronic conductance. U.S. Pat. No. 5,273,837 describes the use of such compositions to form thermal shock resistant solid oxide fuel cells. Fuel cell devices of varies shapes are also known. For example, they may be square, round, rectangular or tubular. The air may be flowing in the direction of the fuel flow (co-flow), in the opposite direction (counter flow), in a perpendicular direction (cross-flow), or radially (radial flow). One common design approach is to utilize a planar fuel cell, where each electrolyte sheet corresponds to a single cell. However, the areas of the single sell that are hotter or correspond to higher reaction concentrations produce more power or current density.

U.S. Pat. No. 6,623,881 describes solid oxide electrolyte fuel cells which include an improved electrode-electrolyte structure. This structure comprises a solid electrolyte sheet incorporating a plurality of positive and negative electrodes of substantially equal sizes, bonded to opposite sides of a thin flexible inorganic electrolyte sheet. One example illustrates that the electrodes do not form continuous layers on electrolyte sheets, but instead define multiple discrete regions or bands, forming individual cells. These regions are electronically connected, by means of electrical conductors in contact therewith that extend through vias in electrolyte sheet. The vias are filled with electronically conductive materials (via interconnects).

SUMMARY OF THE INVENTION

According to one aspect of the invention a fuel cell device comprises: a plurality of fuel cells, each of the plurality of fuel cells having an active area, wherein at least two of the plurality of fuel cells have differently sized active area, such that ratio of the active areas of these two fuel cells is at least 1.1:1.

According to one exemplary embodiment of the invention a fuel cell device comprises: (i) an electrolyte sheet; and (ii) a plurality of electrode pairs arranged on opposing sides of the electrolyte sheet, each of the electrode pairs including an anode and a cathode, wherein at least two of the plurality of electrode pairs are of a different size, such that area ratio between at least two of the plurality of electrode pairs is at least 1.1:1.

In one embodiment of the present invention the fuel cell device includes:
(i) a flexible solid oxide electrolyte sheet composed of stabilized or partially stabilized zirconia; and
(ii) a plurality of positive air and negative fuel electrodes bonded to opposing sides of the electrolyte sheet, wherein at least two of the plurality of electrodes being of different size, such that area ratio between at least two of the plurality of electrode pairs is at least 1.2:1

One of the advantages of the fuel cell device of the present invention is its achievement of high power. Another advantage of the fuel cell device of the present invention is the ability to tailor voltage and heat generated by each fuel cell by controlling the cell size. For example, a uniform amount of voltage may be generated by each of the cells. Yet another advantage of the fuel cell device of the present invention is to maintain the heat generated from each cell within a specified target level in order to maintain a desirable temperature profile.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 17 depicts a model of temperature gradient that the oxide fuel cell device of FIG. 16 was subjected to and optimized for.

FIG. 21a-f illustrates the variation of important operating parameters across another exemplary fuel cell array, under isothermal conditions;

FIG. 22a-22f illustrates the variation of important operating parameters across another exemplary fuel cell array, under isothermal conditions;

FIG. 23a-23f illustrates the variation of important operating parameters across another exemplary fuel cell array, under isothermal conditions;

DETAILED DESCRIPTION OF THE PREFERRED EMBODIMENTS

Figure 1:
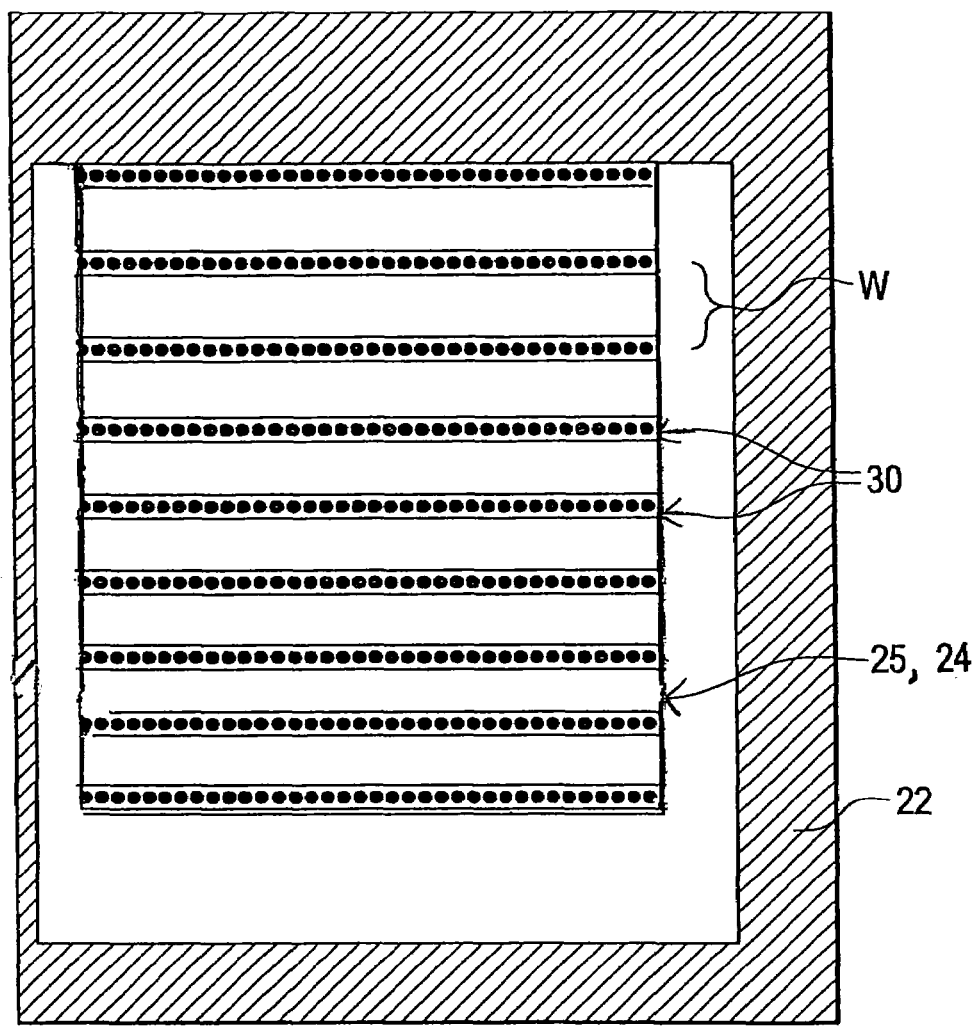
FIG. 1 is a schematic top plane view of a solid oxide fuel cell device of one embodiment of the present invention, the device including eight cells connected in series through interconnect vias.

As described above, U.S. Pat. No. 6,623,881, the contents of which are incorporated by reference herein, discloses solid oxide electrolyte fuel cells which include a solid electrolyte sheet incorporating a plurality of positive and negative electrodes of substantially equal sizes, bonded to opposite sides of a thin flexible inorganic electrolyte sheet. One example illustrates that the electrodes do not form continuous layers on electrolyte sheets, but instead define multiple discrete regions or bands, forming a plurality of individual fuel cells. These regions are electronically connected, by means of electrical conductors in contact therewith that extend through vias (holes) in electrolyte sheet. The vias are filled with electronically conductive materials (via interconnects).

During normal operating conditions different areas of electrode containing electrolyte sheets may experience different temperatures and/or concentrations of fuel and oxidizer (i.e. reactants). This leads to varying performance among the individual fuel cells. For example, applicants found that the fuel cells located in areas of lower temperatures and/or lower reactant concentration provide lower power density than the fuel cells located in areas of higher temperature or higher reactant concentration. Applicants also discovered that by utilizing variable fuel cell sizes (within the same fuel cell device) the overall power output and/or efficiency of the fuel cell device is increased. Furthermore, applicants discovered that by having unequal fuel cell sizes, each of the fuel cells on the electrolyte sheet can generate about the same voltage as the other fuel cells.

More specifically, in at least some of the following examples the active area of the electrode/electrolyte structure is the area of the electrolyte sheet sandwiched between the opposing electrodes. The sizes and the shapes of the electrodes are selected to maximize the active area and to optimize overall power output and/or efficiency of the fuel cell device. The fuel cell's internal ionic resistance (ohm-cm$^2$), electrical resistance and charge transfer (between electrodes and between the reactants and the electrodes) are a strong function of temperature and strongly effects the performance (power density) of an individual fuel cell. However, the heat produced by individual fuel cell is also a strong function of cell's resistance.

According to some of the embodiments of the present invention, in order to compensate for the lower power density produced by the fuel cells subjected to lower temperatures or lower reactor concentration, the fuel cells located at a lower temperature and/or lower reactor concentration (i.e., the fuel cells which produce lower power density) are preferably made larger than the fuel cells located in higher temperature areas and/or higher reactor concentration (which produce higher power densities). Thus, both smaller and larger sized fuel cells would produce about the same amount of power. This would level the power producing capability of each fuel cell and the more efficient fuel cells will not be "driving" the fuel cells with higher internal resistance. This is beneficial because a lower power producing fuel cell can be driven into a less efficient operating condition making the combination of fuel cells less efficient. In an extreme case, the higher power producing fuel cells could even push the lower power fuel cell past the current where any power is produced by the low power fuel cell, and the low power fuel cell will then consume power (by acting as a resistor) rather than producing it. Lastly, if the lower power cells are driven too hard with too much current, the breakdown voltage of the device oxides might be reached, or a portion of the device may melt.

To produce maximal total power, the cell sizes are preferably varied such that each cell, when connected in series to other cells, will produce roughly the same power during maximum power operation. Alternatively, the fuel cell device may have fuel cells organized in sets or subgroups according to temperature distribution, fuel distribution, or current density distribution across the device, such that different regions have different size active areas. For example, regions with lower temperatures may have a set of fuel cells with a larger overall active area than the active area provided by the fuel cells located in the hotter regions.

Therefore, according to an embodiment of the present invention, the fuel cell device includes a plurality of fuel cells, each of the plurality of fuel cells having an active area, wherein at least two of the plurality of fuel cells have differently sized active area, such that ratio of the active areas of these two fuel cells is at least 1.05 to 1 and preferably 1.1:1. This arrangement can be utilized with different fuel cell configurations. Fuels other than hydrogen gas, for example reformed hydrocarbons, may also be utilized.

More specifically, according to one embodiment of the present invention a fuel cell device 20 comprises: (i) at least one electrolyte sheet 22; and (ii) a plurality of electrode pairs 24 arranged on opposing sides of the electrolyte sheet 22. Each electrode pair 24 and the section of the electrolyte sheet 22 sandwiched in between forms a solid oxide fuel cell 25. Each of the electrode pairs includes an anode 26 and a cathode 28. The anodes 26 are on fuel side and the cathodes 28 are on the oxygen facing side. At least two of the plurality of electrode pairs 24 are of different size, such that ratio of active areas between at least two of the plurality of electrode pairs is at least 1.05:1. It is preferable that (active) area ratio between at least two of the plurality of electrode pairs (or fuel cells) is at least 1:1 to 1 and more preferably 1.2:1. Typical area ratio between at least two of the plurality of electrode pairs may be about 1.3:1; 1.4:1; 1.5:1; 1.6:1; 1.7:1; 1.8:1; 1.9:1; 2:1; 2.2:1; 2.5:1; 2.75:1; 3:1 and higher. Of course any other area ratios between those listed above may also be utilized. Furthermore, the fuel cell device my comprise two or more sets or subgroups of fuel cells, each set or subgroup including one or more fuel cells. The subgroups of fuel cell(s) may experience different operating environments. Therefore, in order to compensate for the different operating environments the active area corresponding to different sets or subgroups of fuel cells may have different active areas, such that area ratio between at least two of the fuel cell sets is at least 1.05 to 1, preferably 1:1 to 1 and more preferably 1.2:1. Typical area ratios between two sets of fuel cells may be about 1.3:1; 1.4:1; 1.5:1; 1.6:1; 1.7:1; 1.8:1; 1.9:1; 2:1; 2.2:1; 2.5:1; 2.75:1; 3:1 and higher. Any other area ratios between those listed above may also be utilized.

In the case of fuel cells of equal area connected in series, the current through each cell is the same, and the average current density across each cell is the same. In operation, the fuel cells are subjected to gradients in temperature and reactant concentration that result in variation of the operating voltage, power produced, and heat evolved from each fuel cell. If series-connected fuel cells have different sizes, the current produced from each fuel cell is still the same, however the average current density will be different from cell to cell. The current density will influence the cell operating voltage, power produced, and heat evolved. Hence the ability to modify the current density distribution in the cell array by changing cell areas offers the opportunity to achieve desirable voltage, power, and/or temperature distribution design goals.

The thickness of the electrolyte sheet 22 may be, for example, about 1 mm when the electrolyte is supported on a porous tube, 50 μm to 200 μm for a typical planar frame supported electrolyte sheets and less than 45 μm for a flexible, self supporting electrolyte sheet, such the one described for example in U.S. Pat. No. 6,623,881.

Reference will now be made in detail to the present preferred embodiments of the invention, examples of which are illustrated in the accompanying drawings. Whenever possible, the same reference numerals will be used throughout the drawings to refer to the same or like parts. One embodiment of the fuel cell device of the present invention is shown in FIG. 1, and is designated generally throughout by the reference numeral 10.

Figure 2:
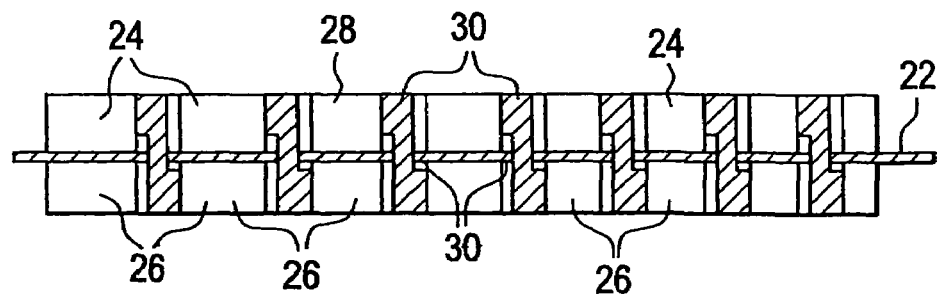
FIG. 2 is a schematic elevation cross-sectional view of the device shown in top plane view of FIG. 1.

As embodied herein and depicted in FIG. 1 the fuel cell device 20 includes a self supporting 3YSZ electrolyte sheet 22 provided with a plurality of electrodes 24 on its top surface. In this embodiment the electrodes 24 have different widths W, therefore forming active areas of different sizes. An electrode width range may be for example, 0.5 mm to about 20 mm. Electrical contact with the electrodes 24 is made through a row of interconnects 30, as shown in FIG. 2. The interconnects 30 traverse the electrolyte sheet 22 trough via holes 30a in the electrolyte sheet 22 and electrically connect the electrochemical cells (fuel cells 25) formed by opposing electrodes (cathodes 28 on top of electrolyte sheet 22 and anodes 26 at the bottom of the electrolyte sheet 22) into a series-connected fuel cell array. According to this embodiment, current is collected at the edges of the electrodes, therefore the cell's placement and geometry should be optimized for the best overall performance. Suitable components for electrolyte sheets are, for example, stabilized or partially stabilized zirconia that may be doped with a stabilizing additive such as oxides of Y, Ce, Ca, Mg, Sc, Nd, Sm, Eu, Gd, Tb, Dy, Ho, Er, Tm, Yb, Lu, In, Ti, Sn, Nb, Ta, Mo, W and mixtures thereof. An exemplary thin electrolyte sheet 22 (10 μm to 45 μm thick) may include 3 to 6 mole % of $Y_2O_3$—$ZrO_2$ which provides low resistive loss, high conductivity, enhanced transformational toughening, and high thermal shock resistance.

The resistivity of electrode materials limits the useful current path lengths trough the electrodes. Metal or cerment electrodes, (e.g., Ni alloy anodes and precious metal electrodes) have a relatively low electrode resistivity and are typically 1 μm to 20 μm thick.

The invention will be further clarified by reference to the following illustrative examples. The advantages of the present invention will be demonstrated by examining the solid oxide fuel cell device operation under at least two conditions. These conditions are: (i) operation of the devices under an imposed thermal gradient, and (ii) operation under uniform temperature, but under reactant concentration gradient.

EXAMPLE 1

Figure 3:
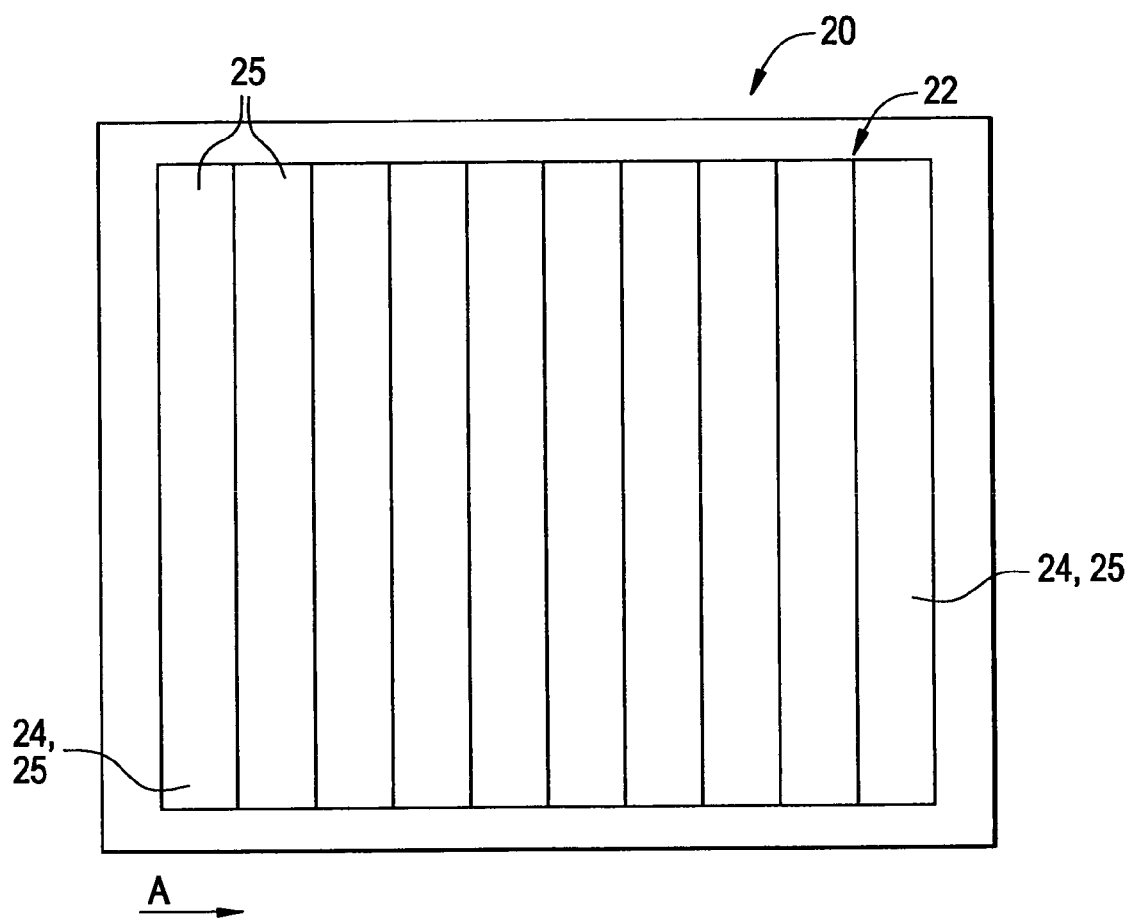
FIG. 3 illustrates a schematic of a fuel cell device containing ten equally sized fuel cells.

To illustrate the advantages of the fuel cell device of the present invention we will compare it with a model of another fuel cell device. This device model includes 10 fuel cells 25, all of equal size, as illustrated in FIG. 3. In this example, hydrogen gas (fuel) and oxygen carrying gas mixture were flowing in the same direction (co-flow condition), left to right. Thus, cell #1 was subjected to the highest amount of fuel and oxygen. As a given cell processes fuel and generates electrical power, it also generates heat due to its electrical/ionic resistance. The heat increases from cell to cell as progressively hotter gas and water vapor (which is a by-product of the reaction) flow toward cell #10.

Figure 4:
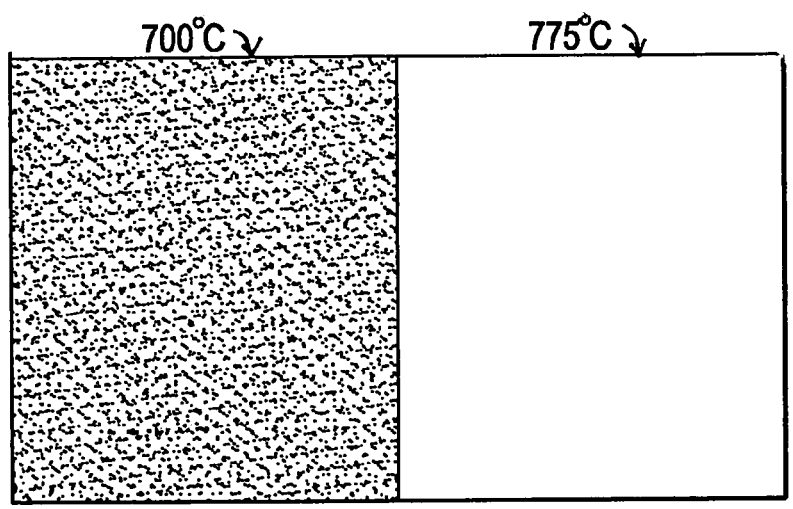
FIG. 4 illustrates schematically temperature distribution across the fuel cell device illustrated in FIG. 3.

In this example, each fuel cell area (active area) is 8 cm$^2$ (width=0.8 cm and length=10 cm) Thus, in the absence of multiple stack configuration, this device has a total active area of 80 cm$^2$ (i.e., for purposes of modeling simplicity, only one electrolyte sheet is being utilized in this exemplary model). Of course, multiple stacks of electrolyte sheets, each containing a plurality of fuel cells will provide higher output power. In order to further simplify the modeling of the solid oxide fuel cell device of FIG. 3 we ignored the space used by vias, via galleries and via pads. In addition, for purposes of simplicity, instead of modeling a progressively continuous and gradual temperature increase, only two sets of temperatures (700° C. and 775° C.) were utilized by this model. More specifically, the model subjected half of the fuel cells of the solid oxide fuel device illustrated in FIG. 3 to a temperature of about 700° C. and the rest of the fuel cells were subjected to the temperature of 775° C. The step function temperature gradient is shown in FIG. 4.

Figure 5:
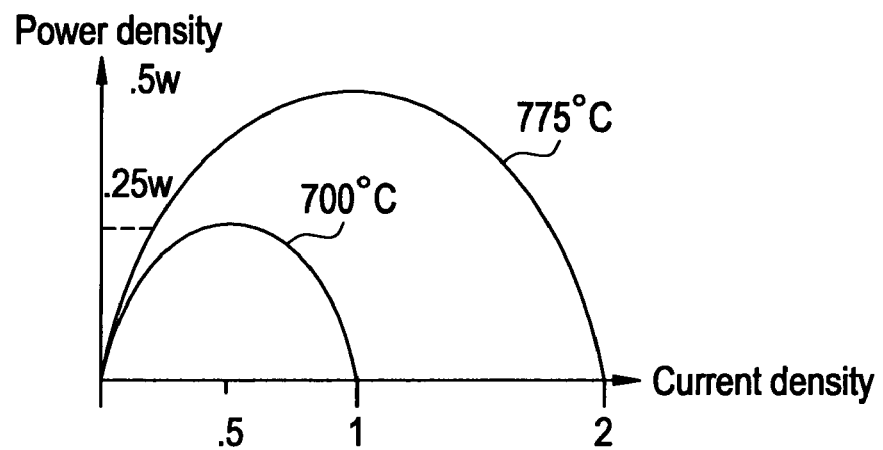
FIG. 5 is an illustration of power density vs. current density for two fuel cells of the device of FIG. 3, where the two fuel cells were subjected to different temperatures due to their different locations.

First, we will consider the power output from each group as if they were operating independently. In order to simplify calculations we'll start with a "unit" fuel cell that is 1 cm long by 1 cm wide, with an active area of 1 cm$^2$. Each of the five unit fuel cells located in the hotter area (775° C.) would produce 0.5 watts/cm$^2$ of electrical power at about 0.5 volts and 1 amp/cm$^2$ peak power. FIG. 5 illustrates that the curve depicting power density vs. current density for these fuel cells is a parabola. In the cooler area (700° C.) of the device each of the five unit cells (located at the left side of FIG. 3) can produce 0.25 Watts/cm$^2$ at about 0.5 volts and 0.5 amp/cm$^2$ peak power. The power density vs. current density curve for these cells is also a parabola (see FIG. 5).

As a first approximation, the power density parabola of the ten cell array connected in series may be approximated as the power density average of the two independent five fuel cell arrays. The areal power density P(Watts/cm$^2$) of a single fuel cell can be calculated from the following equation:

$P=(P_{max}/a_{cell})(1-((I/_{amps}-Ip_{max/amps(a_{cell})})^2)/I_{max/amps(a_{cell})})$, where P max is the maximum power density of the cell, $a_{cell}$ is the area of the cell, I the current in the cell, $Ip_{max}$ is the current density at maximum power and $I_{max}$ is the maximum current density of the cell.

Equation 1 calculates maximum average power density (W/cm$^2$) achieved by the array of fuel cells shown in FIG. 3. It takes into account that there are (i) five fuel cells located in a relatively cool area of the electrolyte sheet, and (ii) five fuel cells located in a relatively hot area of the electrolyte sheet. The total power of the fuel cell device is the product of the power density per cell and the cell area ($a_{cell}$). The areal power density average of all the fuel cells is simply the sum of the powers generated by the cells located both in the hot and cooler regions, divided by the total active area of the two temperature regions, A1 and A2. As shown in FIG. 5, the power density versus current density curve for these fuel cells is parabolic. Therefore, the equation determining the power contribution from each of the cells is a parabolic equation. The term I stands for current and the terms $Ip_{max1}$, $I_{max1}$ and $Ip_{max2}$, $I_{max2}$, are current densities for the fuel cells located in the cooler and hotter areas (area 1 and area 2), respectively. As shown in FIG. 5, the optimum current density for maximum power ($Ip_{max2}$), of the fuel cells located in the hot area is 1A/cm$^2$, while the optimum amount of current density for maximum power ($Ip_{max1}$) for the cooler fuel cells is 0.5 A/cm$^2$. The maximum amount of power per cm$^2$ generated by the hotter fuel cells is 0.5 watts/cm$^2$, while the maximum amount of power per cm$^2$ generated by the fuel cells located in a relatively cool area of the electrolyte sheet is 0.25 watts/cm$^2$. N1 and N2 are the number of cells in the cooler and hotter areas, respectively.

$P$ ave.$=(N1 \times a_{cell1})/A_1[P_{max1}\{1-(I/_{amps}-((Ip_{max1/amps}) \times a_{cell1})))^2/(I_{max1/amps}) \times a_{cell1}\}]+(N2 \times a_{cell2})/A_2[P_{max2}\{1-(I/_{amps}-(Ip_{max2/amps}) \times a_{cell2}))\}^2/(I_{max2/amps}) \times a_{cell2}\}]$  Equation 1

In this example the area of each cell is 1 cm$^2$ and the total active area provided by the 10 cells (5 cells of the hot region and 5 cells of the cooler region) is 10 cm$^2$ (5 cm$^2$+5 cm$^2$). Substituting 0.25$_{watt/cm^2}$, 0.5 amp/$_{cm^2}$, 1 amp/$_{cm^2}$ and 0.5 watt/$_{cm^2}$, 1 amp/$_{cm^2}$ and 2 amps/$_{cm^2}$ for, respectively, $P_{max1}$, $Ip_{max1}$, $I_{max1}$, and $P_{max2}$, $Ip_{max2}$, $I_{max2}$, and 1 cm$^2$ for both $a_{cell1}$ and $a_{cell2}$, with active areas A1 and A2 both being 5 cm$^2$, one now arrives at equation 1'

$P$ ave.$=[0.25_{watts/cm^2}\{1-(I/_{amps}-0.5)^2/1\}]+[0.5_{watts/cm^2}\{1-(I/_{amps}-(1))^2/2\}]$  Equation 1'

Table 1 represents different amounts of average real power density (W/cm$^2$) generated by the cells for a given cell current, I. The first column depicts power densities and the second column depicts current I. Table 1 illustrates that as current increases from 0.025 A to 0.7 A, the average power density increases from 0 to 0.333 W/cm$^2$. However, as the current increases beyond 0.7 A, power density starts to decrease.

TABLE 1

| Average areal power density, watts/cm$^2$ | Current, Amps |
| --- | --- |
| ~0 | 0.025 |
| 0.0245 | 0.050 |
| 0.0481 | 0.075 |
| 0.0708 | 0.100 |
| 0.0925 | 0.125 |
| 0.1133 | 0.150 |
| 0.1331 | 0.175 |
| 0.1520 | 0.200 |
| 0.1700 | 0.225 |
| 0.1870 | 0.250 |
| 0.2031 | 0.275 |
| 0.2183 | 0.300 |
| 0.2325 | 0.325 |
| 0.2458 | 0.350 |
| 0.2581 | 0.375 |
| 0.2695 | 0.400 |
| 0.2800 | 0.425 |
| 0.2895 | 0.450 |
| 0.2981 | 0.475 |
| 0.3058 | 0.500 |
| 0.3125 | 0.525 |
| 0.3183 | 0.550 |
| 0.3231 | 0.575 |
| 0.3270 | 0.600 |
| 0.3300 | 0.625 |
| 0.3320 | 0.650 |
| 0.3331 | 0.675 |
| 0.3333 | 0.700 |
| 0.3325 | 0.725 |
| 0.3308 | 0.750 |
| 0.3281 | 0.775 |
| 0.3245 | 0.800 |

A solid oxide fuel cell device can have, for example, 80 cm$^2$ of total active area. Thus, in this fuel cell device the maximum power output for all ten equal size cells connected in series is about 26.664 Watts (0.333 W/cm$^2$×80 cm$^2$ (active area per device)=26.664 watts).

Figure 6:
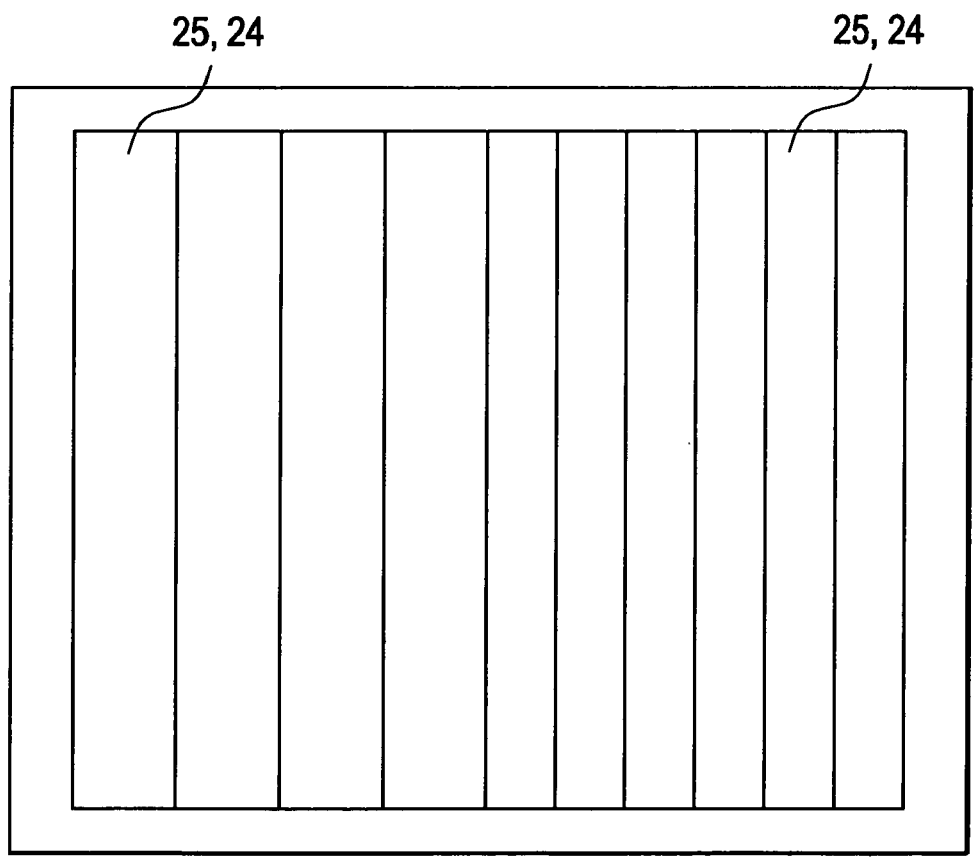
FIG. 6 is a schematic top plane view of a solid oxide fuel cell device of one embodiment of the present invention, the device including two differently sized sets of fuel cells connected in series through interconnect vias (not shown)

FIG. 6 illustrates an exemplary fuel cell device according to the present invention. The total active area of this device is also 80 cm². To model the performance of this device we utilized the same temperature model as described above (FIG. 4). However, the device of FIG. 6 is different from the device of FIG. 3 because in this exemplary fuel cell device we split the cooler half of the electrolyte sheet 22 area into four fuel cells rather than five, while splitting the hotter half of the active electrolyte area into six fuel cells rather than five. Thus we still have a 10 cell device, but the fuel cells now have unequal areas. The performance modeling of the device of FIG. 6 showed that the maximum power produced by this device is increased relative to the device with the equivalent total active area but equally-sized cells.

More specifically, Equation 2 calculates maximum average power density achieved by the array of fuel cells shown in FIG. 6. Equation 2 takes into account that there are four cells located in a relatively cool area and six cells located in a relatively hot area of the electrolyte sheet 22.

As discussed above and shown in FIG. 5, the power density vs. current curve for the fuel cells is a parabolic curve. Therefore, the equation determining the power contribution from each of the cells is a parabolic equation. As in the previous example, the term I stands for current. The optimum current to produce the maximum amount of power by the fuel cells located in the relatively hot area is 0.8333 A. The optimum current to produce the maximum amount of power by the fuel cells located in the relatively cool area is 0.625 A. Here the power curves of the cells are multiplied by their relative area. That is, the fuel cells located in the cooler region are now larger than the original cells by the ratio of 5/4 and are 1.25 cm wide, while the fuel cells located in the hotter region are now smaller by the factor of 5/6, and are 0.833 cm wide. Thus, the maximum of the power curve for the cooler fuel cells shifts and now corresponds to a current of 0.625 A, (i.e., 0.5 A times 5/4), more current due to the larger size of the individual fuel cell, while the current corresponding to maximum power of the hotter fuel cells is 0.833 A, (i.e., 1 A times 5/6), lower currents due to the smaller size of the cell. Note that the current densities at maximum power are not changing, and that the intrinsic performance of the cells doesn't change. The maximum current shifts to 1.25 A for the cells in the cooler region and to 1.666 A for the cells in the hot region.

Table 2 represents different amounts of power density (W/cm²) generated by the fuel cells of this embodiment for a given amount of current, I. The first column depicts power densities and the second column depicts the corresponding current (Amp). Table 2 illustrates that as current increases from 0.025A to 0.75 A, the power density increases from 0 to 0.3686 W/cm². However, as the current increases from 0.75 A, power density starts to decrease. In order to simplify initial calculations all of the cells are initially modeled to be 1 cm long. That is, the fuel cells located in the cooler area are 1.25 cm in width and 1 cm long, while in the hotter areas they are 0.833 cm in width and 1 cm in length. Thus, in this example, the area of each cell in the cooler side is 1.25 cm², the area of each cell in the hotter side is 0.8333 cm² and the total area of the hot and cooler cells is 10 cm² (5 cm²+5 cm²). Substituting 0.25 watt/cm², 0.5 amp/cm2, 1 amp/cm² and 0.5 watt/cm², 1 amp/cm² and 2 amps/cm² for, respectively, $P_{max1}$, $Ip_{max1}$, $I_{max1}$ and $P_{max2}$, $Ip_{max2}$, $I_{max2}$, and 1.25 cm² for $a_{cell1}$ and 0.8333 cm² for $a_{cell2}$, with A1 and A2 both being 5 cm² into equation 1, one now arrives at equation 2.

The average maximum power density per unit area was calculated to be 0.3685 watt/cm² (for the 10 cell device with the cell length of 1 cm). Therefore, maximum power generated by these unequal size cells (connected in series) in a fuel cell device that has 80 cm² active area is 0.3685 watts times 80 cm², or 29.48 Watts, a 10% increase over the power generated by the fuel cell device with the identical overall active area but the equal cell sizes. (See Equation 2' and Table 2).

$$P\ ave.=(4\times a_{cell1})/A_1[0.25_{watts/cm^2}\{1-(I/_{amps}-0.625)^2/1.25\}]+(6\times a_{cell2})/A_2[0.5_{watts/cm^2}\{1-(I/_{amps}-(0.833))^2/1.666\}] \quad \text{Equation 2}$$

$$P\ ave.=[0.25_{watts/cm^2}\{1-(I/_{amps}-0.625)^2/1.25\}]+[0.5_{watts/cm^2}\{1-(I/_{amps}-(833))^2/1.666\}] \quad \text{Equation 2'}$$

Table 2

The average maximum power density per unit area was calculated to be 0.3685 watt/cm² (for the 10 cell device). Therefore, maximum power generated by these unequal size cells (connected in series) is about 0.3685 watts times 80 cm², or 29.48 Watts, a 10% increase with no power generation area increase. (See Equations 2 and 2' and Table 2).

$$P\ ave.=(4\times a_{cell1})/A_1[0.25_{watts/cm^2}\{1-(I/_{amps}-0.625)^2/1.25\}]+(6\times a_{cell2})/A_2[0.5_{watts/cm^2}\{1-(I/_{amps}-(833))^2/1.666\}] \quad \text{Equation 2}$$

$$P\ ave.=[0.25_{watts/cm^2}\{1-(I/_{amps}-0.625)^2/1.25\}]+[0.5_{watts/cm^2}\{1-(I/_{amps}-(833))^2/1.666\}] \quad \text{Equation 2'}$$

TABLE 2

| Average areal power density, watts/cm2 | Current, Amps |
|---|---|
| 0.0009 | 0.025 |
| 0.0255 | 0.050 |
| 0.0492 | 0.075 |
| 0.0721 | 0.100 |
| 0.0941 | 0.125 |
| 0.1153 | 0.150 |
| 0.1356 | 0.175 |
| 0.1551 | 0.200 |
| 0.1738 | 0.225 |
| 0.1915 | 0.250 |
| 0.2085 | 0.275 |
| 0.2245 | 0.300 |
| 0.2398 | 0.325 |
| 0.2541 | 0.350 |
| 0.2677 | 0.375 |
| 0.2804 | 0.400 |
| 0.2922 | 0.425 |
| 0.3032 | 0.450 |
| 0.3133 | 0.475 |
| 0.3226 | 0.500 |
| 0.3310 | 0.525 |
| 0.3386 | 0.550 |
| 0.3453 | 0.575 |
| 0.3512 | 0.600 |
| 0.3562 | 0.625 |
| 0.3604 | 0.650 |
| 0.3637 | 0.675 |
| 0.3662 | 0.700 |
| 0.3678 | 0.725 |
| 0.3686 | 0.750 |
| 0.3685 | 0.775 |
| 0.3676 | 0.800 |
| 0.3658 | 0.825 |

EXAMPLE 2

Figure 7:
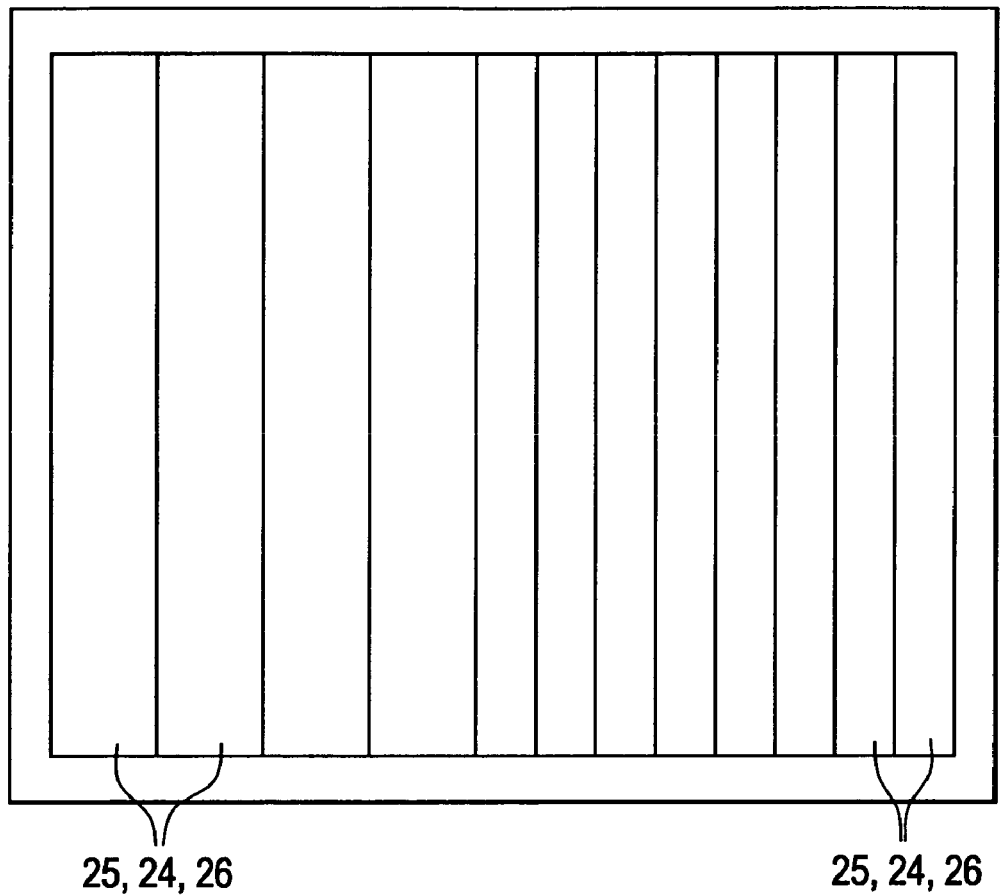
FIG. 7 is a schematic top plane view of a solid oxide fuel cell device of another embodiment of the present invention, the device including two differently sized sets of fuel cells, the first set having four fuel cells and the second set having eight fuel cells.

Another exemplary solid oxide fuel cell device is depicted schematically in FIG. 7. This device has a total of 12 fuel cells, while retaining the total active area of 80 cm². To model the performance of this device we utilized the same temperature model as described above (FIG. 4). However, in this exemplary device we kept the number of cooler fuel cells at four and increased number of cells in the hotter area to eight. As in the previous example, the cells in the two temperature regions are of different sizes.

The performance modeling of the device of FIG. 7 showed that the maximum power produced by this device is increased relative to the device of the previous example and that of the equal sized cell device illustrated in FIG. 3. More specifically, the maximum average power density output (i.e. averaged over 12 cells), when the fuel cells are connected in series, would be about 0.375 watts/cm$^2$, about a 12.5% increase, relative to the device with the equivalent total active area but equal-sized cells.

Equation 3 is the equation utilized by the applicants to obtain results depicted in Table 3. More specifically, Equation 3 calculates maximum average power density achieved by the array of fuel cells shown in FIG. 7. As stated above, our model takes into account that there are 4 fuel cells located in a relatively cool area and 8 fuel cells located in a relatively hot area of the electrolyte sheet 22. We again modeled the power density vs. current by a parabolic equation. That is, the equation determining the power contribution from each of the cells is a parabolic equation. The term I stands for current and, as discussed above, the optimum current for maximum power of the cells located in the hot area is 0.625 A, while the optimum current for maximum power available for the cooler cells is also 0.625 A. Here the power curves of the cells are multiplied by their relative area, i.e. the maximum of the power of the cooler cells corresponds to 0.625 A, (5/4 cm$^2$×0.5 amp/cm$^2$), more current due to the larger size of the individual cell, while the maximum power of the hotter cells now also corresponds to 0.625 A, (5/8 cm$^2$×1 amp/cm$^2$), a lower current due to the smaller size of the cell. Note that the once again current densities at maximum power are not changing, the intrinsic performance of the cells doesn't change, just the size of the cells.

Table 3 represents different amounts of power density (watts/cm$^2$) generated by the cells for a given amount of current I. The first column depicts power densities and the second column depicts current. Table 3 illustrates that as current increases from 0.025 A, to 0.625 A, the power density increases from about 0 to 0.375 watts/cm$^2$. However, as the current increases from 0.625 A, power density starts to decrease. The cells are now 1.25 cm in width in the cooler area and 1 cm long while in the hotter areas they are 0.6125 cm in width and 1 cm in length. Substituting 0.25$_{watt/cm^2}$, 0.625 amp/$_{cm^2}$, 1.25 amp/$_{cm^2}$ and 0.5$_{watt/cm^2}$, 0.625 amp/$_{cm^2}$ and 1.25 amp/$_{cm^2}$ for, respectively, $P_{max1}$, $Ip_{max1}$, $I_{max1}$ and $P_{max2}$, $Ip_{max2}$, $I_{max2}$, and 1.25 cm$^2$ for $a_{cell1}$ and 0.6125 cm$^2$ for $a_{cell2}$ with A1 and A2 being 5 cm$^2$ one arrives at:

$$P\ ave.=(4 \times a_{cell1})/A_1[0.25_{watts/cm^2}\{1-(I/_{amps}-0.625)^2/1.25\}]+(8 \times a_{cell2})/A_2[0.5_{watts/cm^2}\{1-(I/_{amps}-(0.625))^2/1.25\}] \quad \text{Equation 3}$$

$$P\ ave.=[0.25_{watts/cm^2}\{1-(I/_{amps}-0.625)^2/1.25\}]+[0.5_{watts/cm^2}\{1-(I/_{amps}-(0.625))^2/1.25\}] \quad \text{Equation 3'}$$

TABLE 3

| Average areal power density, watts/cm$^2$ | Current, Amps |
|---|---|
| 0.003 | 0.025 |
| 0.051 | 0.050 |
| 0.085 | 0.075 |
| 0.110 | 0.100 |
| 0.135 | 0.125 |
| 0.158 | 0.150 |
| 0.181 | 0.175 |
| 0.202 | 0.200 |
| 0.221 | 0.225 |
| 0.240 | 0.250 |

TABLE 3-continued

| Average areal power density, watts/cm$^2$ | Current, Amps |
|---|---|
| 0.257 | 0.275 |
| 0.274 | 0.300 |
| 0.289 | 0.325 |
| 0.302 | 0.350 |
| 0.315 | 0.375 |
| 0.326 | 0.400 |
| 0.337 | 0.425 |
| 0.346 | 0.450 |
| 0.353 | 0.475 |
| 0.360 | 0.500 |
| 0.365 | 0.525 |
| 0.370 | 0.550 |
| 0.373 | 0.575 |
| 0.374 | 0.600 |
| 0.375 | 0.625 |
| 0.374 | 0.650 |
| 0.373 | 0.675 |
| 0.370 | 0.700 |
| 0.365 | 0.725 |
| 0.360 | 0.750 |

EXAMPLE 4

Figure 8:
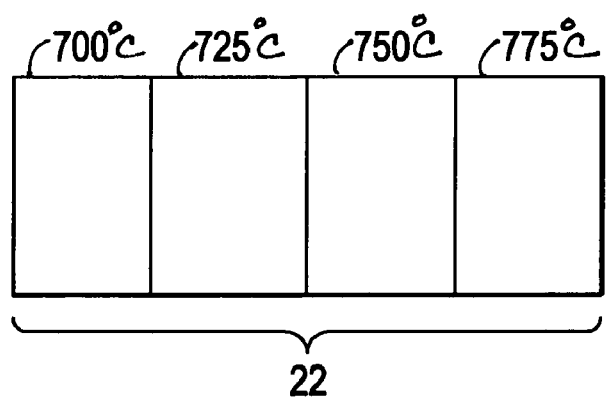
FIG. 8 is a schematic illustration of temperature distribution model utilized in conjunction with the fuel cell device illustrated in FIG. 9.
Figure 9:
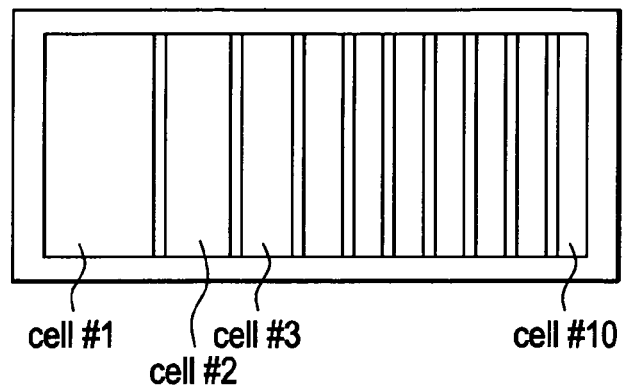
FIG. 9 is a schematic top plane view of a solid oxide fuel cell device of another embodiment of the present invention, the device including four differently sized sets of fuel cells.

A more accurate model would subdivide the electrolyte sheet into more than two temperature zones. If the temperature across the electrolyte sheet 22 is divided into four areas (as shown in FIG. 8) instead of two areas (as illustrated in FIG. 4) the distribution of the fuel cells on the electrolyte sheet will look like the one illustrated in FIG. 9, with progressively smaller cells being in progressively hotter zones.

EXAMPLE 5

Figure 10:
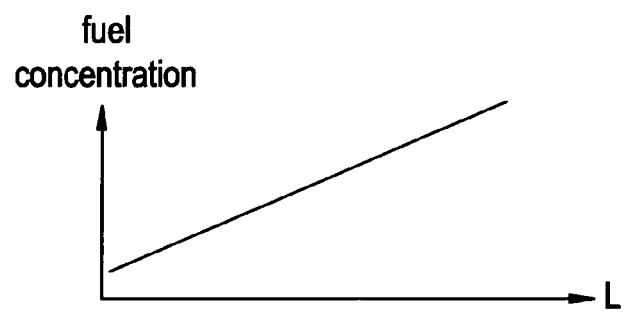
FIG. 10 is a schematic depiction of fuel concentration across an electrolyte sheet with multiple fuel cells.
Figure 11:
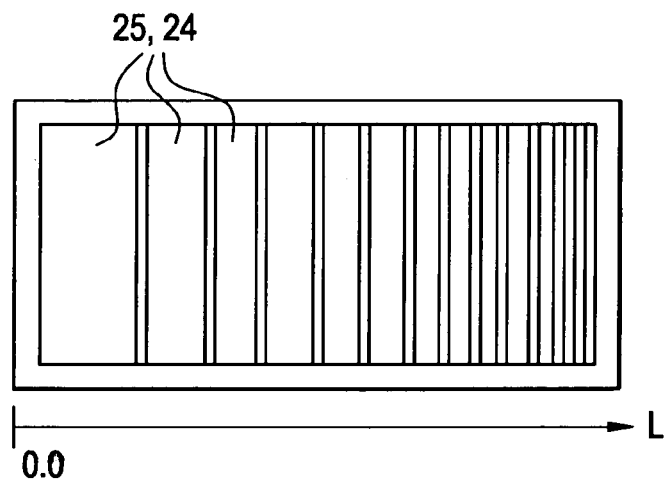
FIG. 11 is a schematic top plane view of a solid oxide fuel cell device of one embodiment of the present invention, the embodiment being designed to operate with fuel distribution depicted in FIG. 10.

Similarly, under isothermal conditions, if part of the electrolyte sheet is located in the area of lesser fuel concentration (due to gradual fuel depletion), the electrolyte sheet 22 would contain progressively larger fuel cells in the areas with less fuel concentration. (See FIGS. 10 and 11.) Of course, one may have to account for both fuel depletion as well as a temperature gradient of the fuel cell device. The final configuration of the fuel cell device would depend on what effect predominates at a specific area of the electrolyte sheet and this in turn is determined the overall device size, by reactant flow rates, cell(s) resistance (which is also determined specific materials and layer thicknesses) and the direction of the reactant's flow.

EXAMPLE 6

Figure 12:
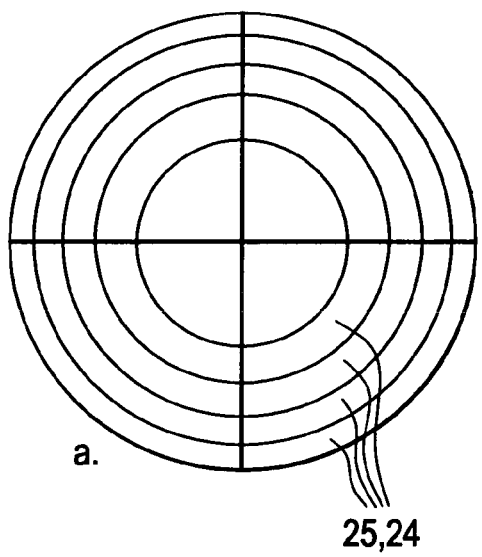
FIG. 12 is a schematic top plane view of a solid oxide fuel cell device which is designed to operate with radial fuel flow.
Figure 13:
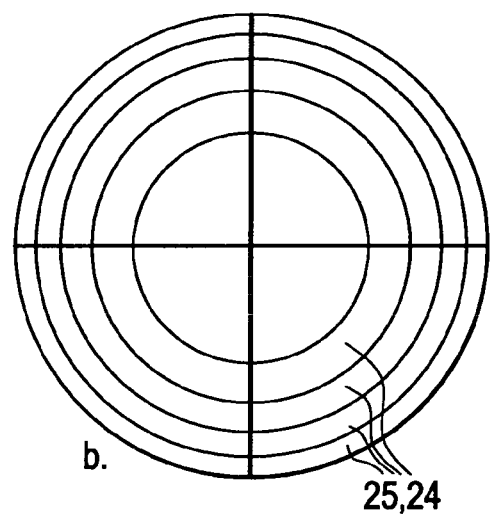
FIG. 13 is a schematic top plane view of a solid oxide fuel cell device of one embodiment of the present invention which is designed to operate with radial fuel flow and which has differently sized fuel cells, where the size of the fuel cells is increasing toward the center.
Figure 14:
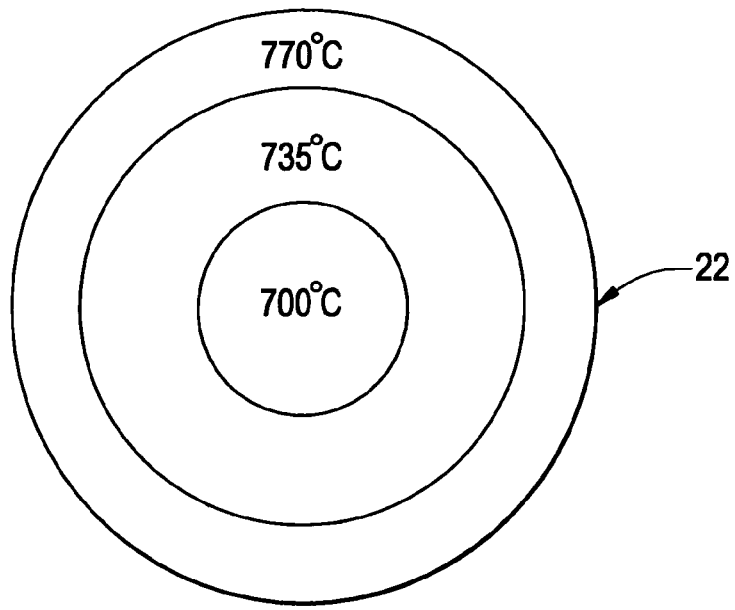
FIG. 14 is a schematic illustration of temperature distribution model utilized in conjunction with the analysis of fuel cell devices illustrated in FIGS. 12 and 13.

FIG. 12 is a schematic of a radial flow fuel cell device where the electrolyte and electrodes are split into four quadrants with five equal area cells in each quadrant (with vias, via gallery, via pads, leads, and gas inlet/exhaust omitted from the drawing). FIG. 13 is a schematic of a fuel cell device utilizing radial flow fuel cells in accordance with the present invention, with the size of the fuel cells increasing toward the center, with the area increase being 10% per cell. The current flow in this device is also in the radial direction. If the fuel cell device operates under the temperature gradient such as that shown in FIG. 14, this arrangement would result in each cell performing at a more similar potential than the device depicted in FIG. 12. Thus, the configuration of FIG. 13 results in higher production of power than that of FIG. 12.

EXAMPLE 7

Figure 15:
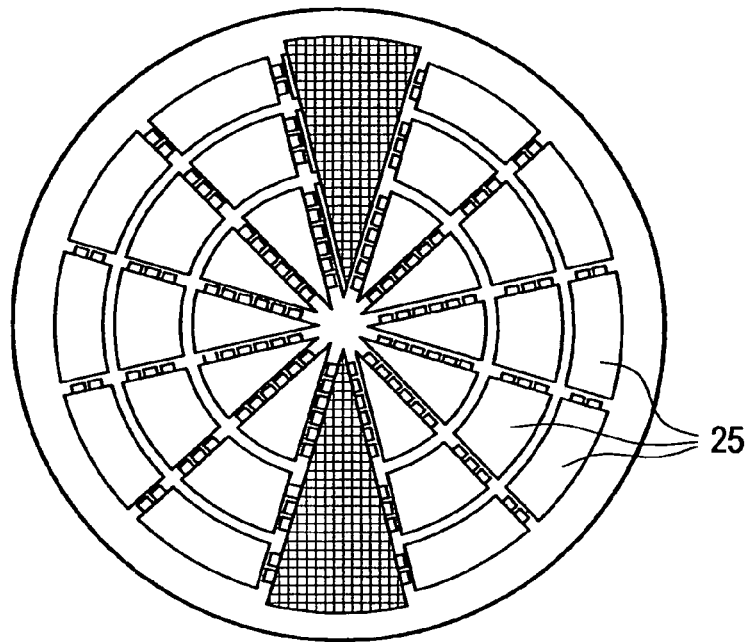
FIG. 15 is a schematic top plane view of a solid oxide fuel cell device of another embodiment of the present invention which is designed to operate with radial fuel flow and which has differently sized fuel cells.

Fuel cell devices with multiple cells may utilize various combinations and permutations for interconnecting the individual cells to one another. FIG. 15 illustrates schematically a radial flow fuel cell device with vias, via galleries and via pads. In this fuel cell device the current flow is circumferential. This fuel cell device also includes fuel cells with unequal size area.

EXAMPLE 8

Figure 16:
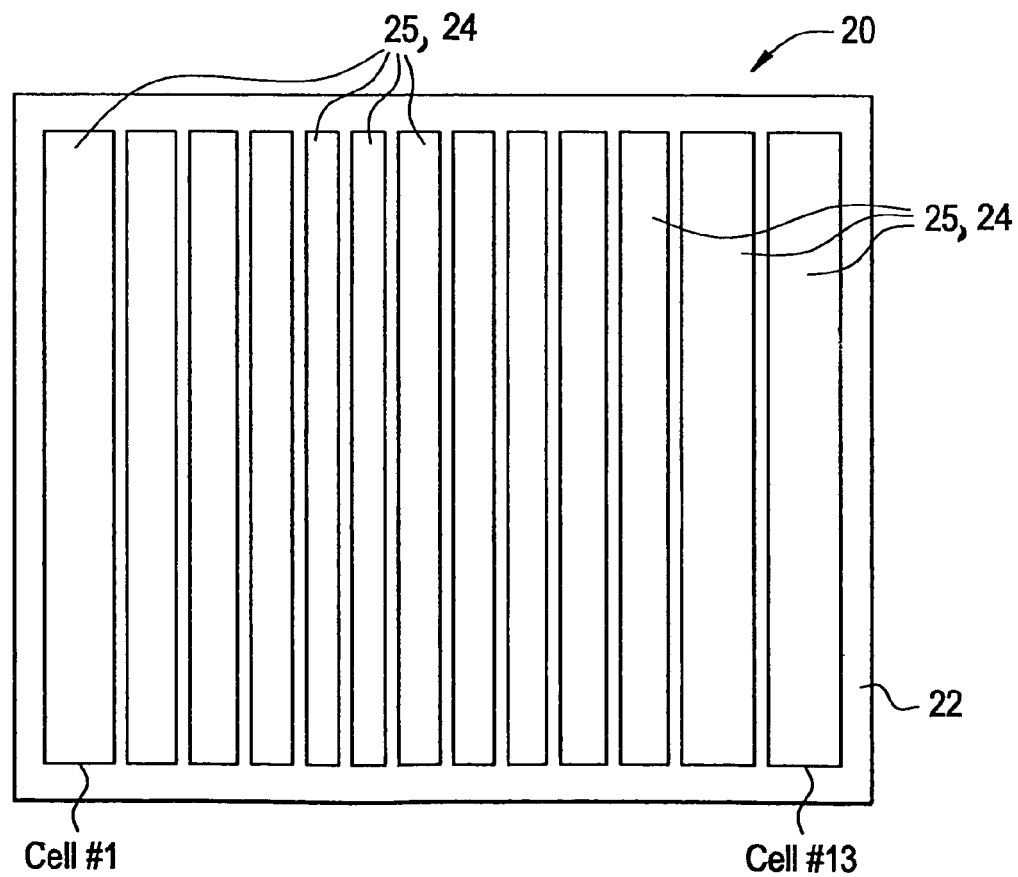
FIG. 16 is a schematic top plane view of a solid oxide fuel cell device of one embodiment of the present invention, the device including 13 fuel cells and operating in a counter-flow environment.

As illustrated in FIG. 16, the solid oxide fuel cell device 20 of this example includes a flexible ceramic electrolyte sheet, with cells/electrodes of differing active area. The electrolyte is a self supporting 3YSZ electrolyte sheet 22 containing a plurality of electrodes 24 forming a plurality of fuel cells. To size the individual cells 25 for total maximum power, the cell sizes are adjusted such that each fuel cell of this exemplary device is connected in series to at least one other fuel cell and produces roughly the same power during maximum power operation.

Figure 17:
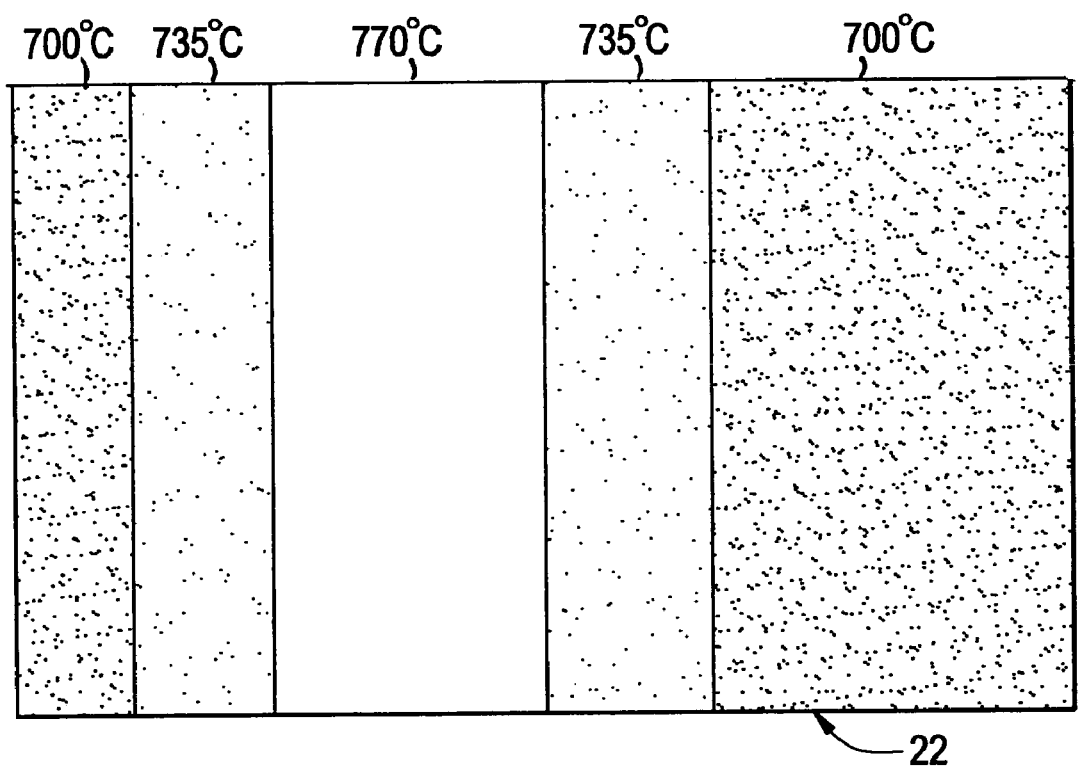
Figure 18A:
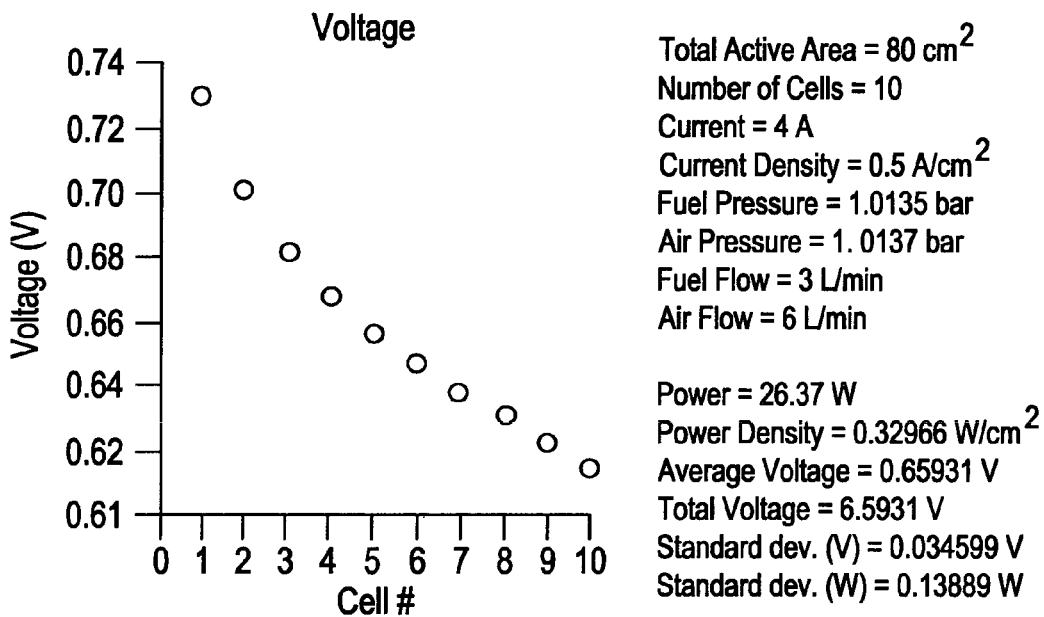
FIG. 18a-18f illustrates the variation of important operating parameters across an exemplary cell array, under isothermal conditions.
Figure 18B:
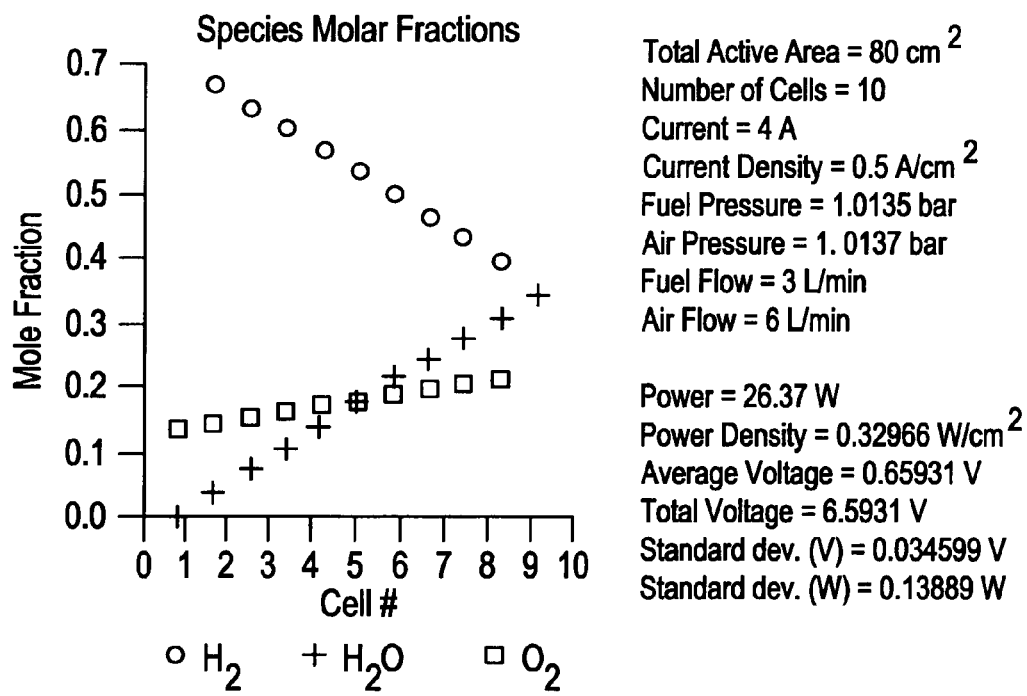
Figure 18C:
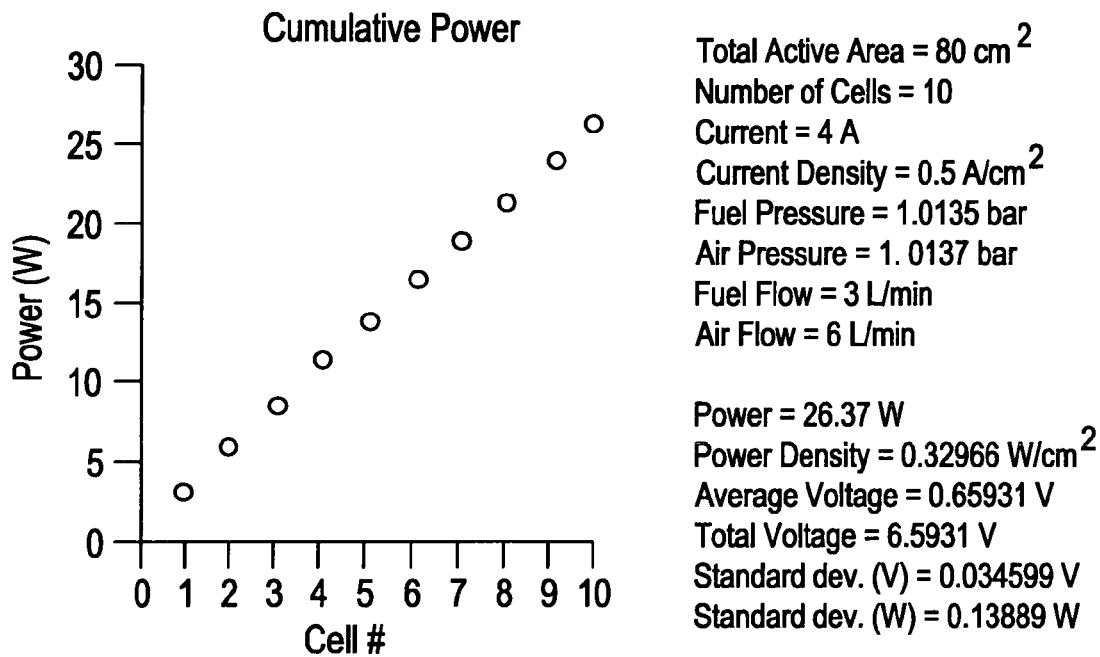
Figure 18D:
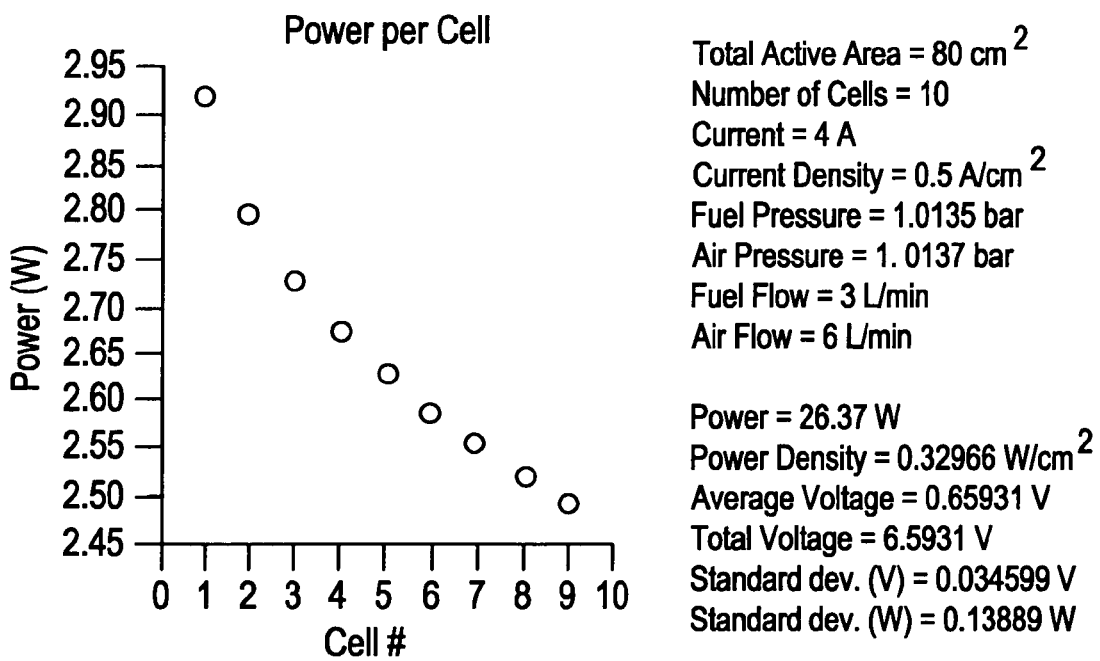
Figure 18E:
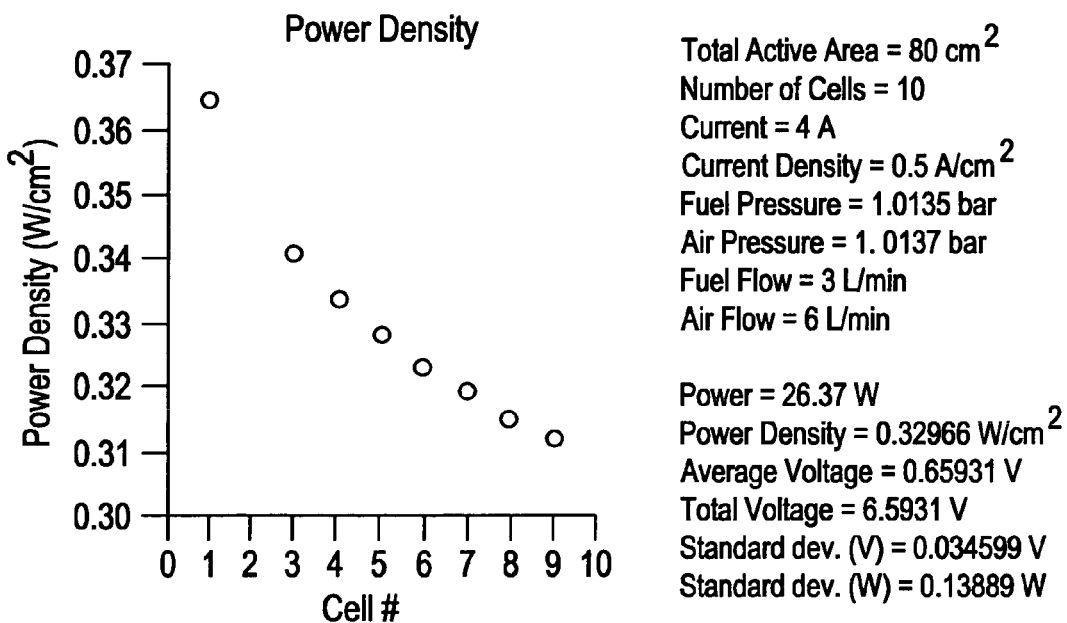
Figure 18F:
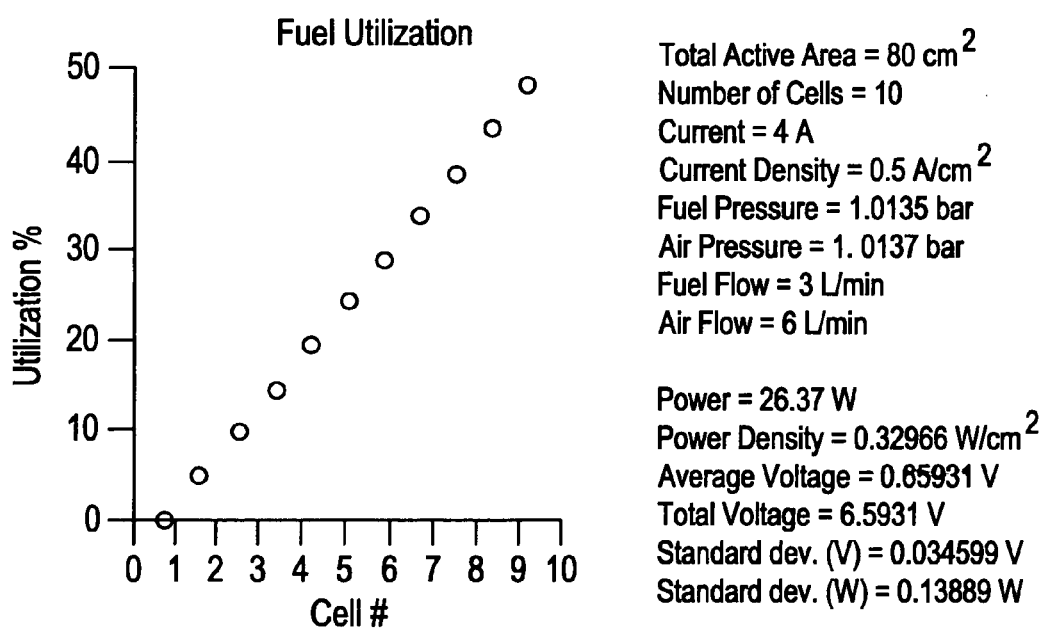

FIG. 16 illustrates schematically that this exemplary fuel cell device includes thirteen fuel cells (i.e., 13 anode/cathode pairs). FIG. 17 depicts schematically an illustrative temperature gradient that the electrolyte sheet 22 is subjected to during normal device operation. In the actual operating example the temperature gradient is continuous, a more accurate temperature model would have more than five temperature zones, or would model the heat distribution as a continuous gradient. However, the present model is sufficient to illustrate the design approach of the exemplary fuel cell devices of the present invention.

This temperature gradient was produced because hydrogen (fuel) and oxygen gases were flowing in opposite directions. (Hydrogen was flown left to right and oxygen was flown right to left. Thus, cell #1 was subjected to the highest amount of fuel and cell #13 was subjected to the highest amount of oxygen.) As a given cell consumes hydrogen and generates electrical power, it also generates heat due to its internal resistance. The heat increases from cell to cell, with heated fuel and heated reactant product gasses carrying the heat from cell #1 toward cell #13. Thus, cells 1 through 4 are relatively cool, but the cells located near the middle of the electrolyte sheet 22 are hotter. In this example, the air flow (carrying $O_2$) is in opposite direction from the fuel flow and the air flow rate is about 4-5 times greater than the fuel flow. Thus, the relatively cool air carries the heat away in direction opposite to the fuel flow, but heats up in the process as it reaches the cells located in the middle of the electrolyte sheet 22. Therefore, the last few cells (cells 11, 12 and 13) are relatively cool and the cells in the middle of the electrolyte sheet 22 are hot. As illustrated in FIG. 16, the fuel cell device 20 has smaller fuel cells in the hotter area (shown with the exaggerated size variation). A similar design may be used for the devices utilized under isothermal condition (when the cells experience the same temperatures) to compensate for lower reactant concentration in some areas of the device.

Flexible electrolyte sheet is should preferably have flexibility sufficient to permit a high degree of bending without breakage under an applied force. Flexibility in the electrolyte sheets is sufficient to permit bending to an effective radius of curvature of less than 20 centimeters or some equivalent measure, preferably less than 5 centimeters or some equivalent measure, more preferably less than 1 centimeter or some equivalent measure.

By an "effective" radius of curvature is meant that radius of curvature which may be locally generated by bending in a sintered body in addition to any natural or inherent curvature provided in the sintered configuration of the material. Thus, the resultant curved electrolyte sheets can be further bent, straightened, or bent to reverse curvature without breakage.

The flexibility of the electrolyte sheet will depend, to a large measure, on its thickness and, therefore, can be tailored as such for a specific use. Generally, the thicker the electrolyte sheet the less flexible it becomes. Thin electrolyte sheets are flexible to the point where toughened and hardened sintered ceramic electrolyte sheet may bend without breaking to the bent radius of less than 10 mm. Such flexibility is advantageous when the electrolyte sheet is used in conjunctions with electrodes and/or frames that have dis-similar coefficients of thermal expansion and/or thermal masses.

EXAMPLES 9-17

It may be desirable for the solid oxide fuel cell device to satisfy multiple objectives. One such objective is generation of maximum power. Another objective is to maintain all cells at an equi-potential level, i.e., to ensure that each of the fuel cells (if the fuel cells are arranged in series) situated on a given electrolyte sheet generate roughly the same voltage. The design configurations meeting these two objectives may not be the same. A third objective, in keeping the overall operability of the solid oxide fuel cell device (including the electrolyte sheet, the chamber design, flow rates of gasses, entrance and exit designs etc.) is to be able to manage the evolved heat and to maintain all fuel cells as close to isothermal conditions as possible. Isothermal conditions are desirable, for example, to minimize thermo-mechanical stress.

The optimal arrangement of fuel cells may be an acceptable compromise between maximizing power output of the device and maintaining cells in an iso-potential arrangement. In examining the performance of the device illustrated in FIG. 3 and the following examples, applicants found that the maximum power requirement is achieved by uniform area cells, while the requirement of balanced voltage between cells requires the cells to be staggered in area somewhat: the cell near the $H_2$ inlet having least area. Through modeling, we have discovered that it is possible to have an optimal geometry which is good from both perspectives. For example, a device with cell areas increasing in an arithmetic progression is one such design. This arrangement also offers benefits from a thermal management standpoint as described below.

Under isothermal conditions of operation (desired mode of operation), the advantages from varying cell areas (keeping the total active area and number of cells fixed, and for a fixed fuel ($H_2$) and air flow rate), are:

1.) Without sacrificing total power output of the electrolyte sheet too much, one can maintain the different cells very close to iso-voltage conditions (i.e., the voltage generated by each fuel cell is same or bounded within a small margin);

2.) This allows a side advantage in that the heat generated from each fuel cell is also within a specified target and hence maintains a more uniform temperature environment (or a desirable temperature profile) on the electrolyte sheet. This is clearly desirable from a system management standpoint. In addition, this may help aging characteristics of the electrolyte sheet.

Consider the solid oxide fuel cell device shown in FIG. 3. We modeled its performance under isothermal conditions (725° C. throughout) The model combines reactant and product ($H_2$, $O_2$, $H_2O$) molar balances, dependence on reversible voltage of a given cell as a function of temperature and partial pressures through the Nernst equation, and voltage-current density (V-i) behavior of the electrolyte/electrode sheet obtained from single-cell experiments. As described above, FIG. 3 illustrates a schematic view of the solid oxide fuel cell sheet 22 with 10 individual cells of constant size (constant area). In this example, the reactant gasses are introduced in a counter-flow arrangement, i.e., fuel ($H_2$) and air flow in opposite directions. The electrolyte sheet 22 of FIG. 3 includes 80 cm of total active area, with 10 fuel cells each having an area of 8 $cm^2$. The current through the system is fixed at 4 Amps, the fuel pressure is 1.0135 bar and the air pressure is 1.0137 bar. The fuel flow rate is 3 L/min while the air flow rate is 6 L/min. The fuel is 70% $H_2$ at the inlet (forming gas), while there is 21% $O_2$ in the incoming air inlet. In this counter-flow arrangement, the fuel is fresh on cell #1 (left most cell, corresponding to the left most data points on FIGS. 18a-f) and the air is fresh on cell #10.

FIGS. 18a-f show variation of important operating parameters across the cell array, under isothermal conditions (725° C.). A total of 26.37 W of power is generated by this solid oxide fuel cell device. The $H_2$ mole fraction falls from cell number 1 to cell number 10, as more and more $H_2$ is consumed by the electrochemical reaction on the electrolyte sheet 22. The voltage (first small figure) drops significantly from cell number 1 to cell number 10, because of lowering $H_2$ partial pressure. This variation is quantified by the reported standard deviation in voltage to be 0.0346 V, leading to a standard deviation in power to be 0.139 W. Thus, the overall power is high but the cells are not isopotential, which is not a desirable situation.

Figure 19:
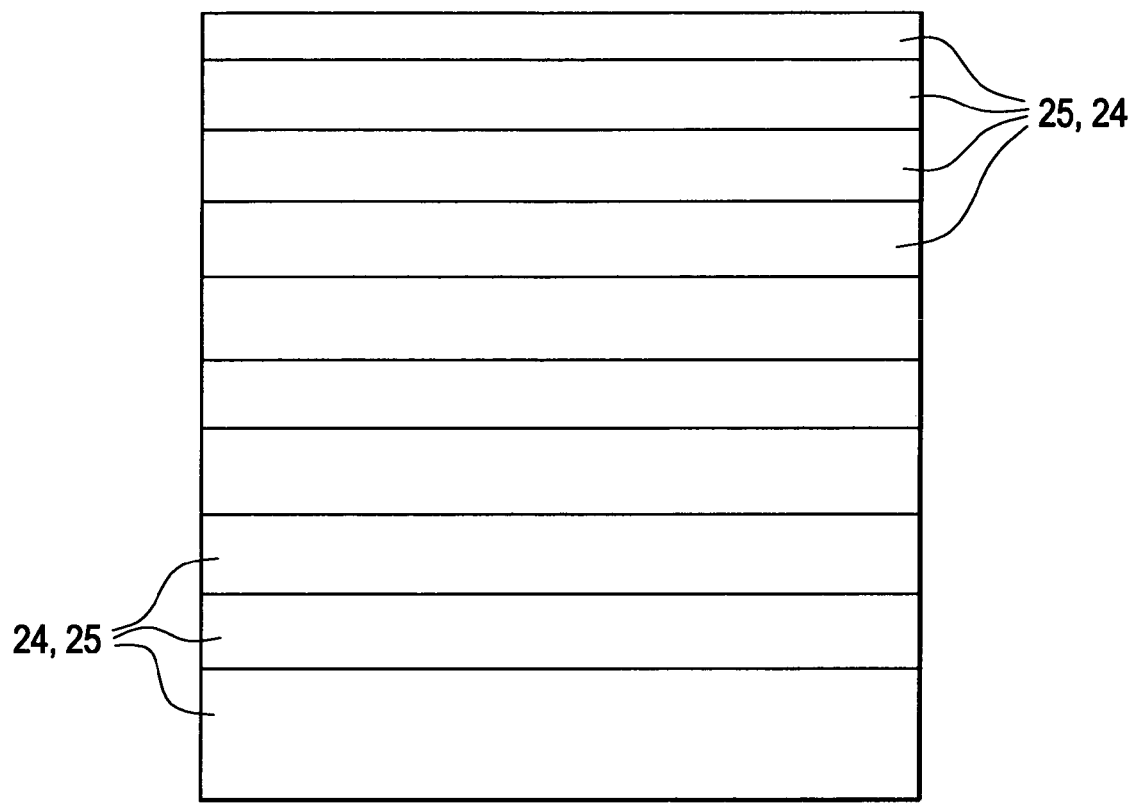
FIG. 19 is a schematic top plane view of a solid oxide fuel cell device of one embodiment of the present invention.
Figure 20A:
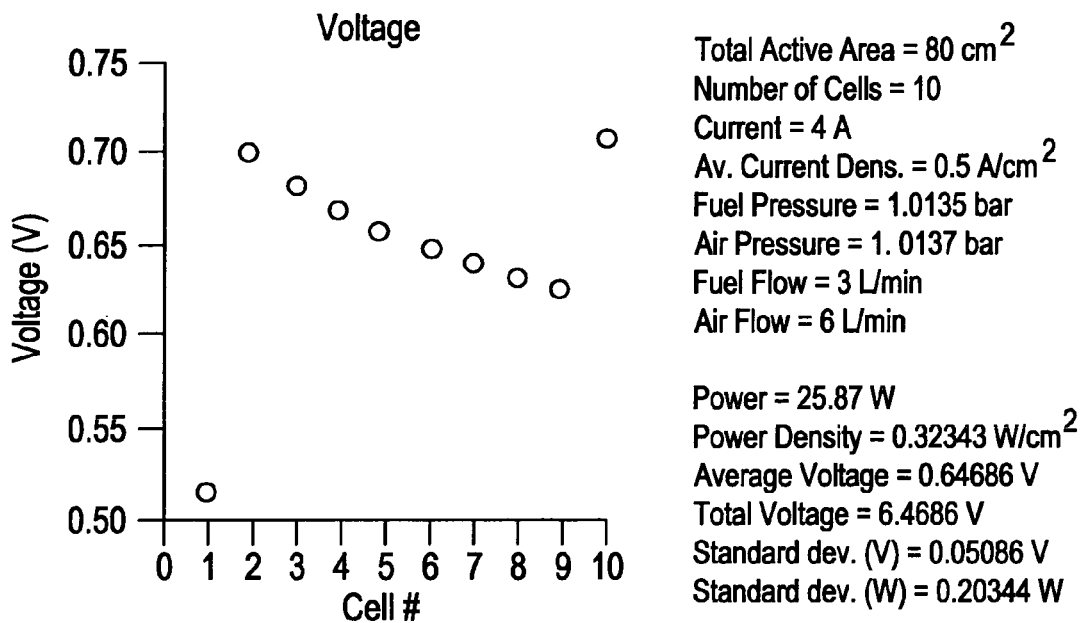
FIG. 20a-f illustrates the variation of important operating parameters across an exemplary fuel cell array, under isothermal conditions.
Figure 20B:
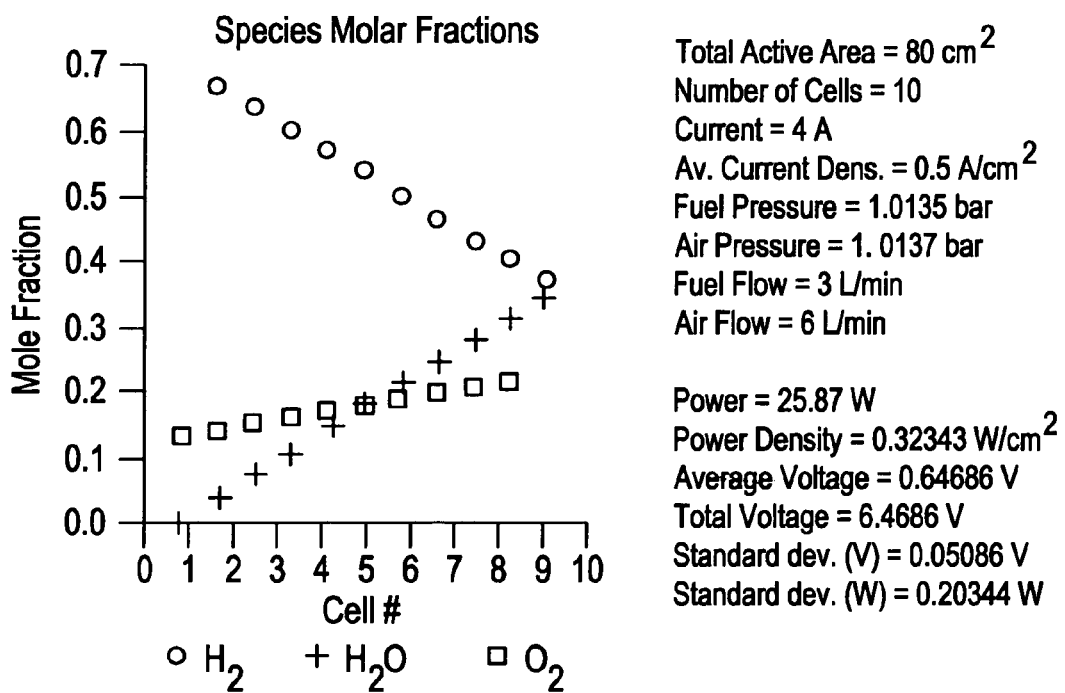
Figure 20C:
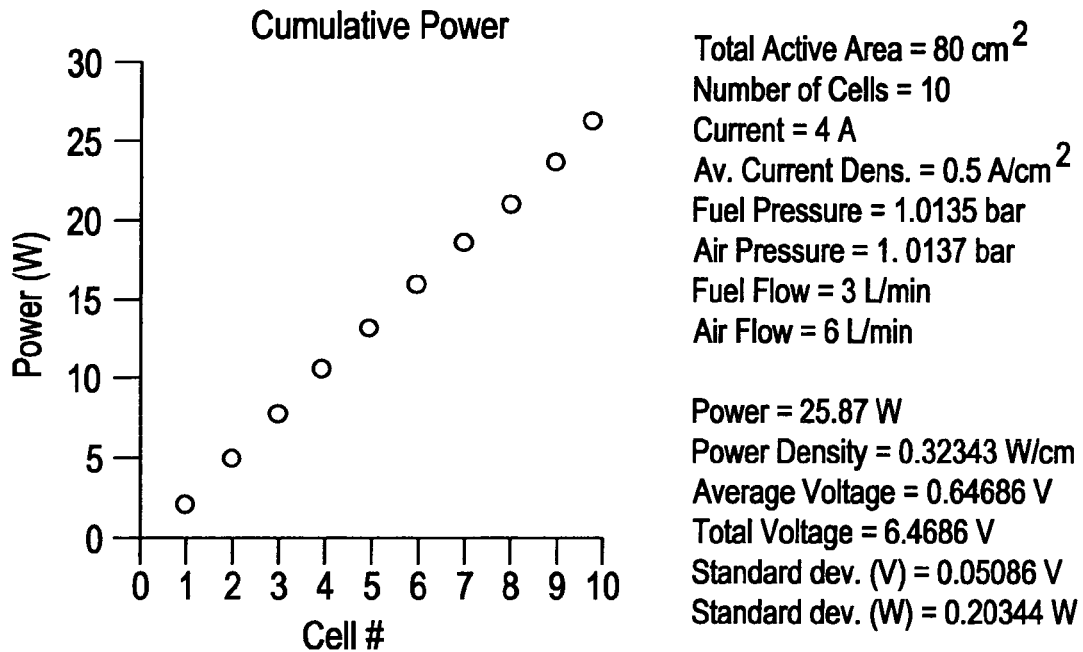
Figure 20D:
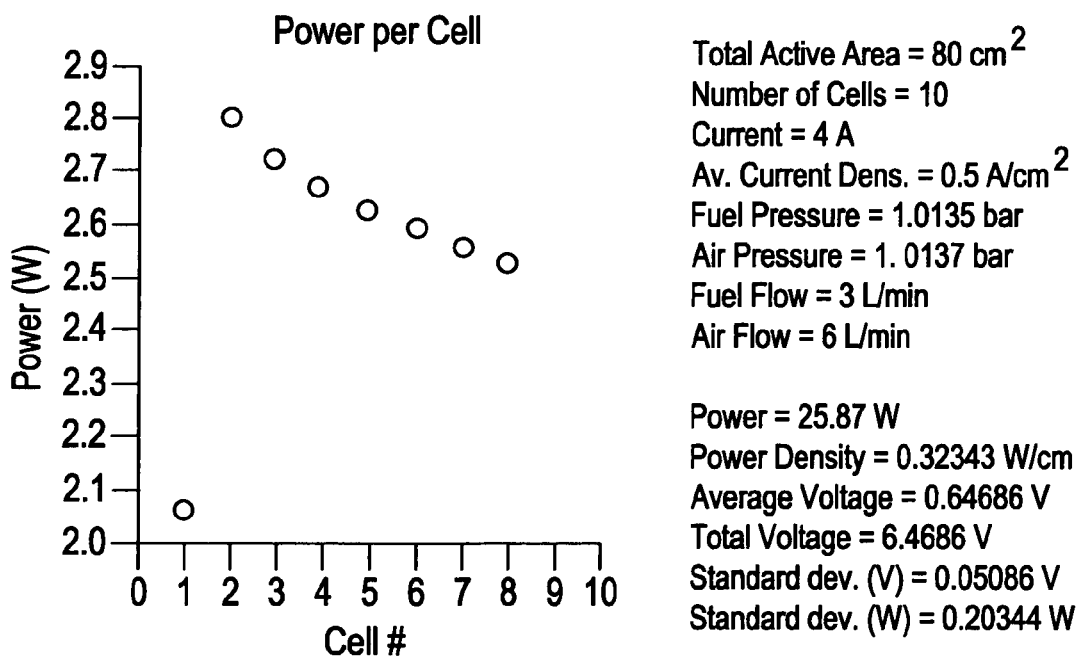
Figure 20E:
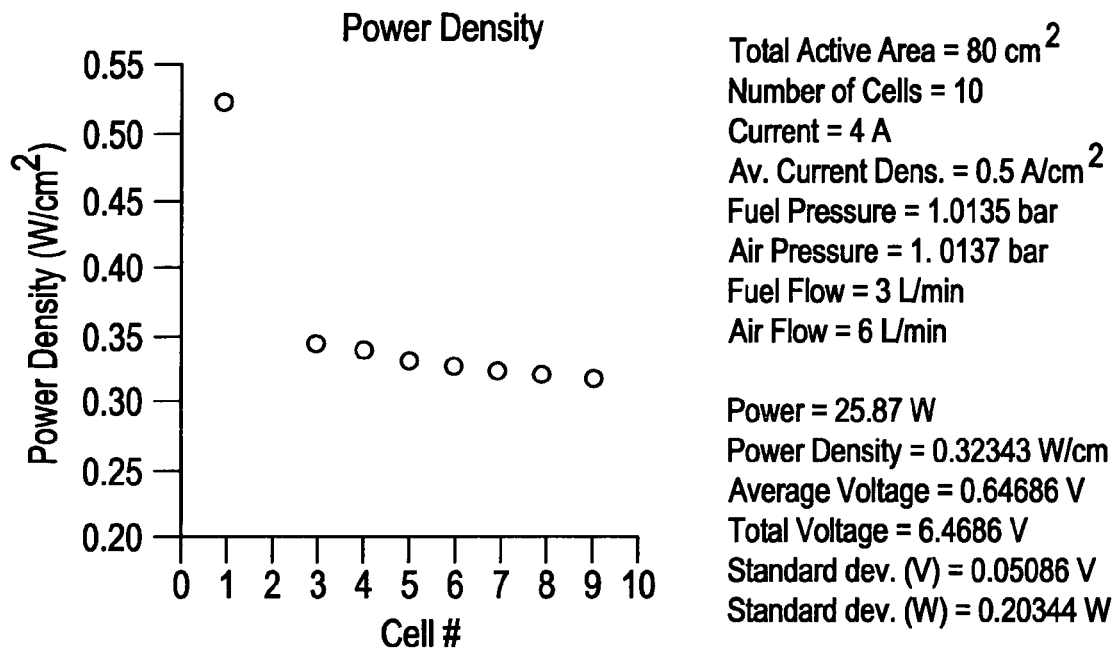
Figure 20F:
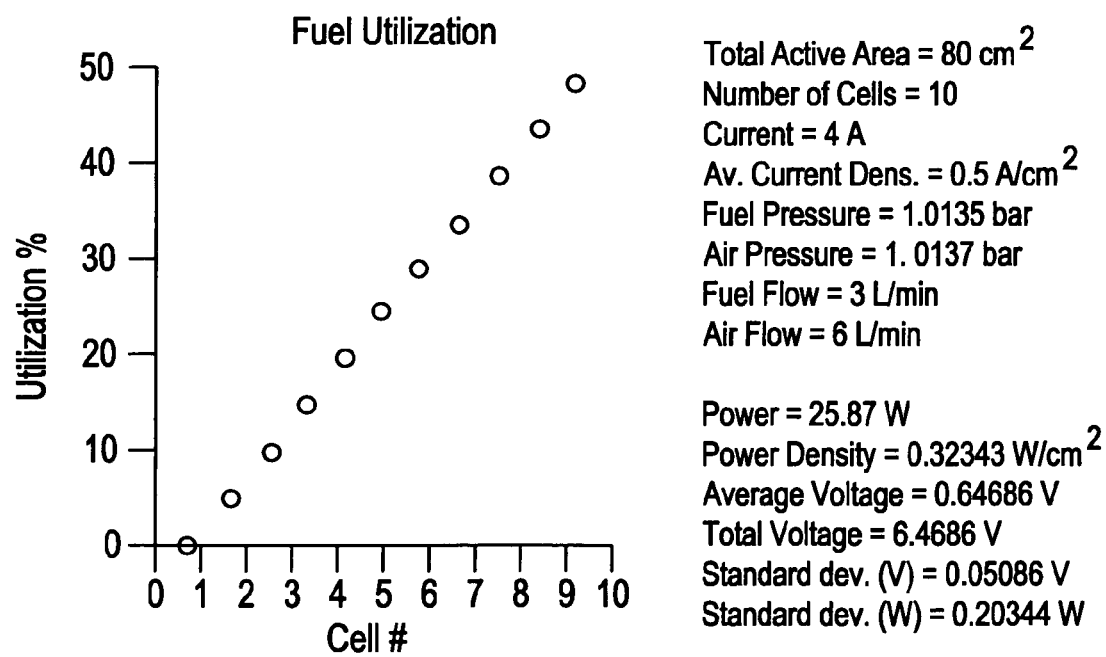
Figure 21A:
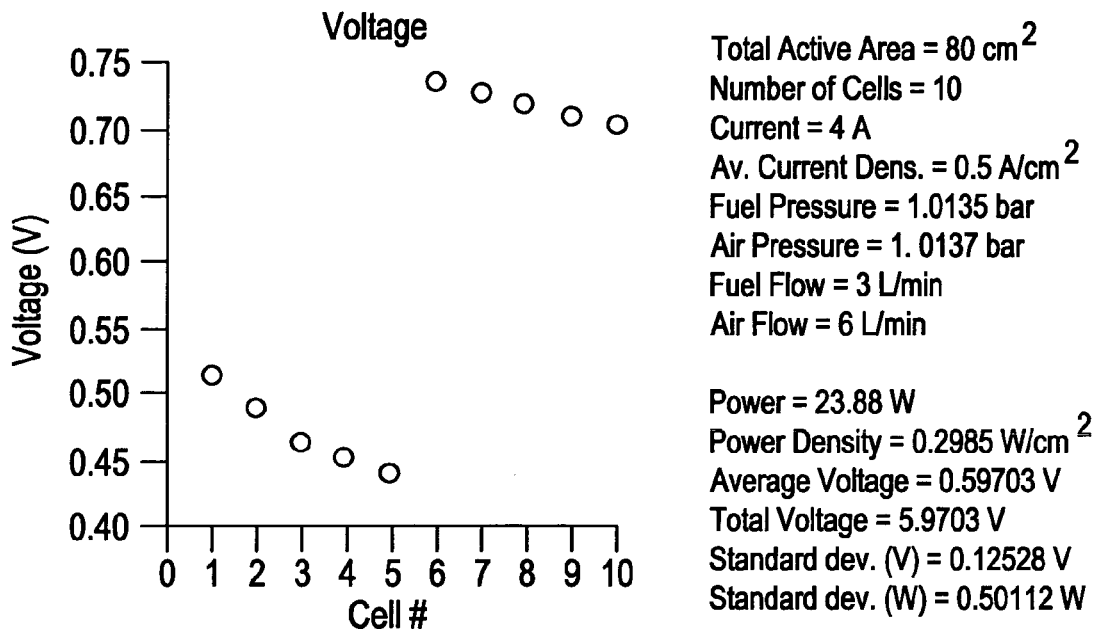
Figure 21B:
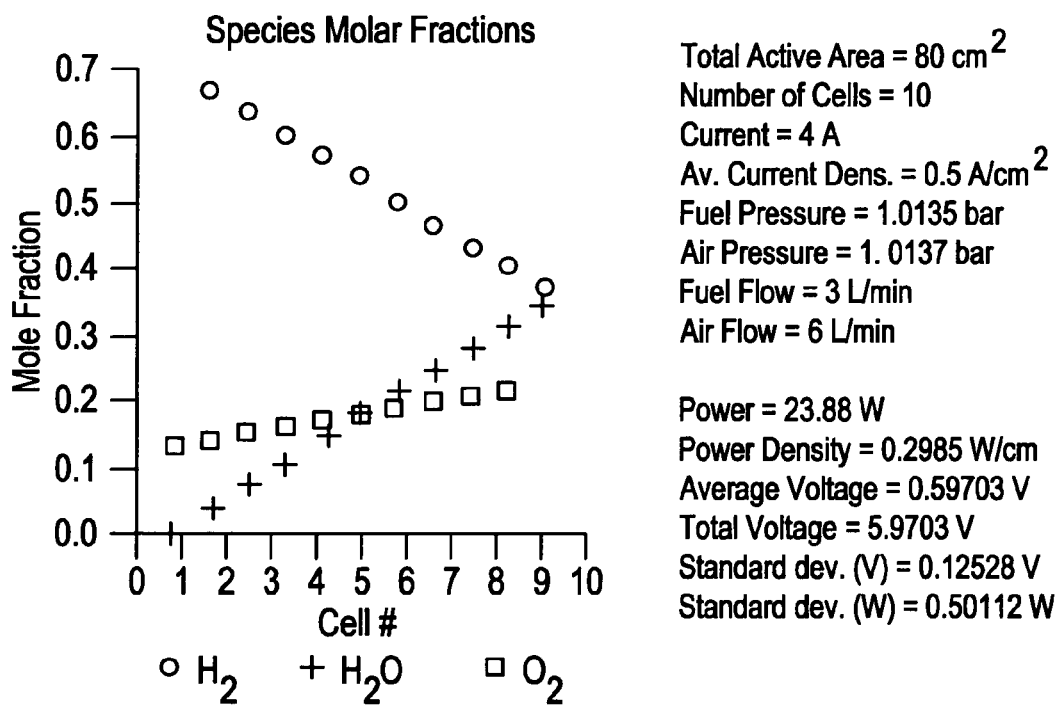
Figure 21E:
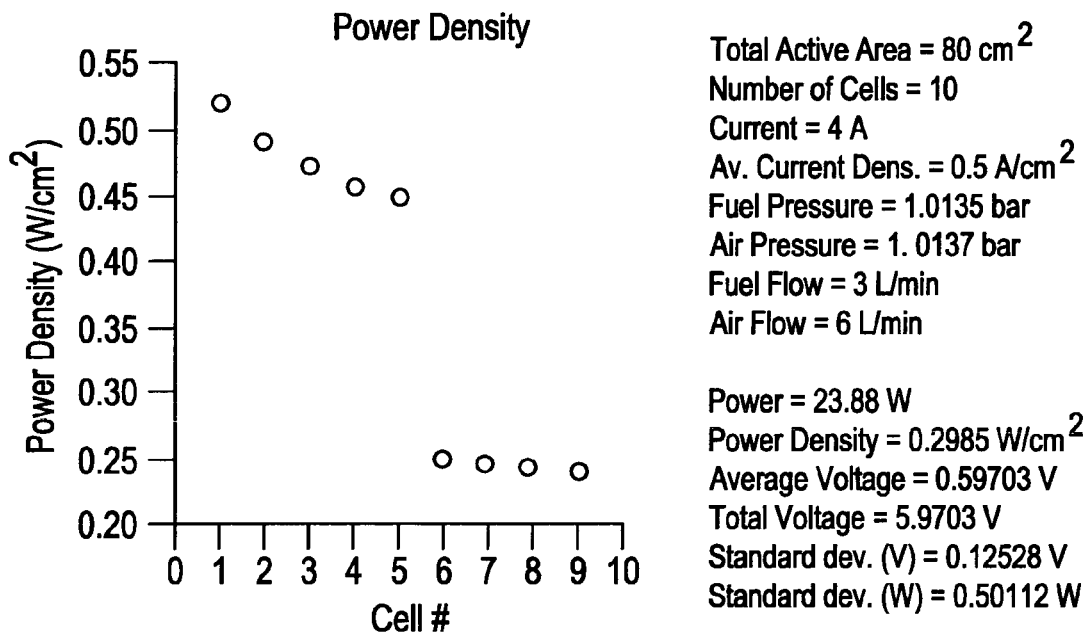
Figure 21F:
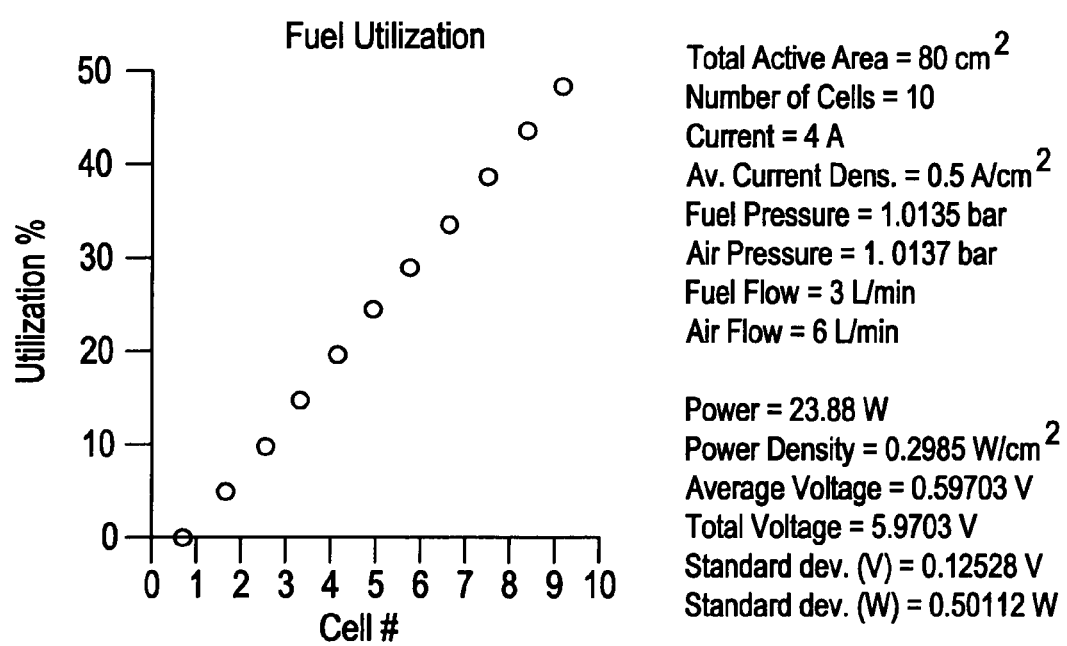
Figure 22A:
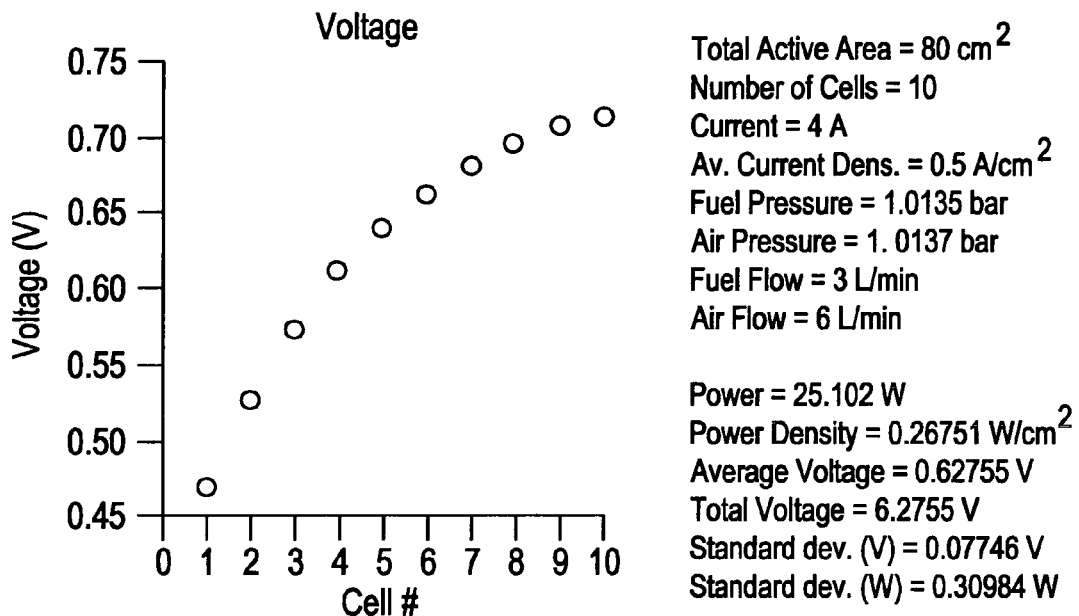
Figure 22B:
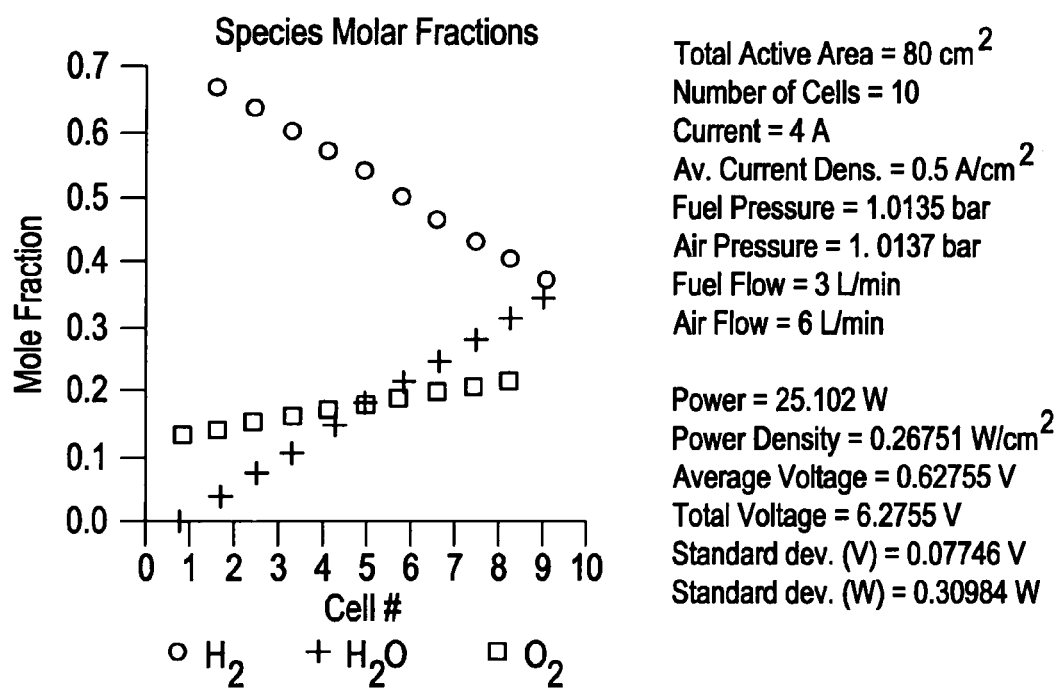
Figure 22C:
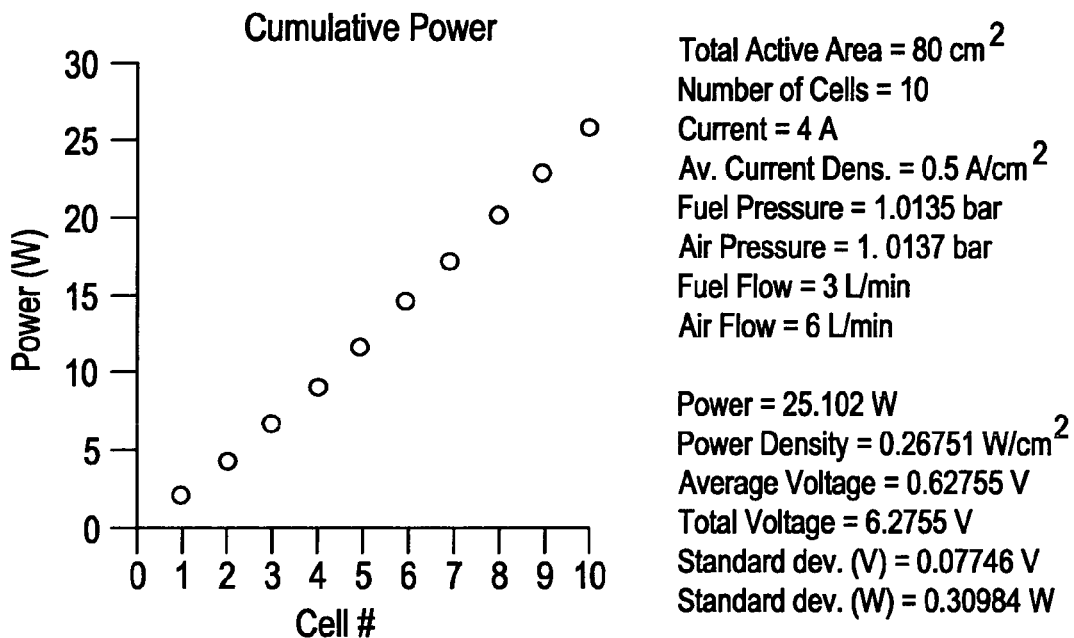
Figure 22D:
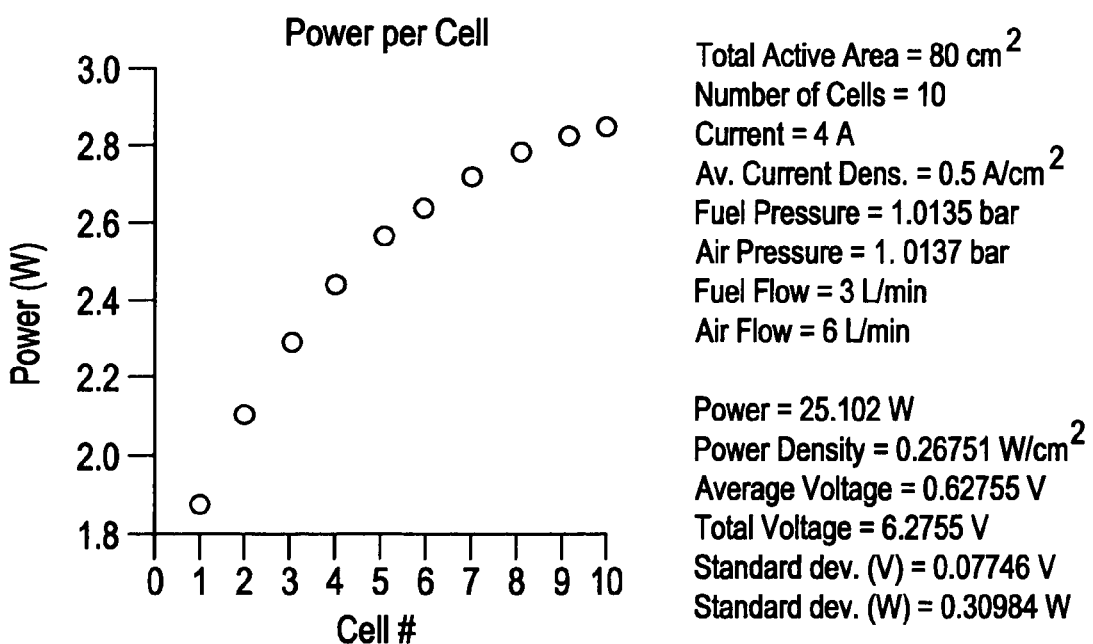
Figure 23C:
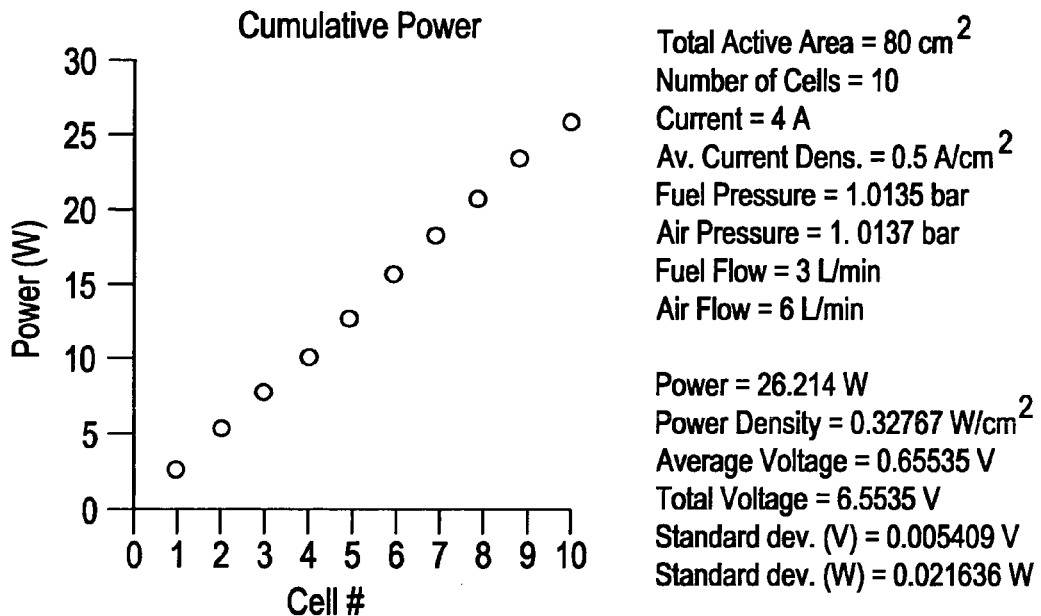
Figure 23D:
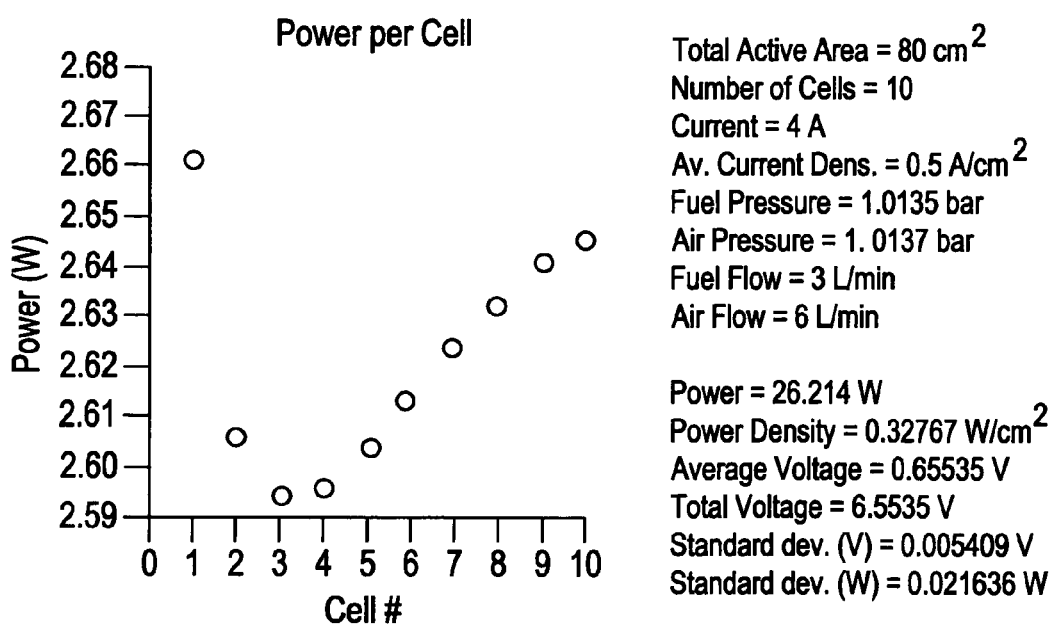

The 10 cell fuel cell device of FIG. 3 was then modified. The modified device according to this embodiment of the present invention is depicted schematically in FIG. 19. The total active electrolyte sheet area is retained, but the 4 $cm^2$ of area is taken away from the first cell (cell #1) and added to the last cell (cell #10). (As described above, the fuel is fresh on cell #1 (corresponding to the left most point in FIGS. 20a-20f) and the air is fresh on cell #10). The $H_2$ mole fraction falls from cell number 1 to 10, as more and more $H_2$ is consumed by the electrochemical reaction on the electrolyte sheet 22. FIGS. 20a-20f illustrate the performance of the modified fuel cell device depicted in FIG. 19. The same amount of current flows through all the cells, when the fuel cells are connected in series. The total power provided by this device drops by a little, to 25.87 W. This happens because (i) in the first cell (active area of 4 $cm^2$), the current density rises due to reduction in active area from 8 $cm^2$ to 4 $cm^2$, and hence voltage drops; while (ii) in the last cell (active area of 12 $cm^2$) voltage rises by a compatible amount. Hence the voltage profile across the cell array is more uniform.

FIGS. 21a-21f illustrate performance of another embodiment of the fuel cell device. In this modified device each of the first five fuel cells (counting from the fuel entry point) have the active area of 4 $cm^2$, while the active area of each of the other five fuel cells is 12 $cm^2$. Again, one notices a fall in maximum power. Also, the standard deviation of voltage per cell is much higher, as shown in FIGS. 20 and 21, than that shown in FIG. 18, which is not desirable.

FIGS. 22a-22f, illustrate performance of yet another embodiment of the fuel cell device. In this device the cell areas have been varied in arithmetic progression with the first cell having an active area of 3.5 $cm^2$ and the last cell being 12.5 $cm^2$, with each intermediate cell having 1 $cm^2$ more active area compared to its immediate predecessor. FIG. 22 illustrates (comparing to FIG. 18), that the voltage profile has been reversed, the first cell being at lowest voltage and the last cell being at the highest voltage.

This is motivation to look for an intermediate situation, between FIGS. 18 and 22, wherein the voltage variation across all of the fuel cells is minimized. Also, we want to be close to maximum power that can be extracted from the electrolyte sheet.

FIGS. 23a-f illustrate performance of another modified fuel cell device in which the cell areas have been varied in arithmetic progression, with the first cell have 6.3125 $cm^2$ active area, the last cell has 9.6875 $cm^2$ active area, and the standard difference between successive cell areas is 0.375 $cm^2$. The total power generated by this device is 26.214 W, which is very close to the maximum possible value of 26.37 W in this isopotential model. Also, the voltage variation from cell to cell is minimal, with the standard deviation in cell voltages being only 0.0054 V. Thus, the fuel cells operate at nearly equal potential (they are voltage balanced) in addition to generating good power.

This is a desirable scenario from an actual operability standpoint, because typically the fuel cell stack will operate under varying external loads which will draw different currents from the system. As the current flowing through the system varies, the $H_2$ consumption also varies and depending on the other operating conditions, some cells may produce very high voltage and some very low. The staggering of cell areas ensures that the device performance is stable and all the cells could produce almost the same voltage, at any given operating condition.

There is an added benefit to such an arrangement. For every mole of fuel ($H_2$) converted, some part of useful work (electrical voltage) is produced and some part converts into heat. When the voltages are balanced and uniform from cell-to-cell across the electrolyte sheet, the heat produced by each cell is also uniform. This is because in a series arrangement of cells (as here), the current is same through all the cells and hence the consumption of $H_2$ per cell is fixed. Thus, having isopotential cells connected in series results in almost the same amount of heat also being produced by each cell. This can be desirable from an overall thermal management perspective. The latter of course depends on the exact design of internals, fins, etc. as well as flow rates of fuel and air (which affects convective heat transfer), however, having roughly equal heat evolution in each cell means the design targets for thermal management are simplified.

Figure 24:
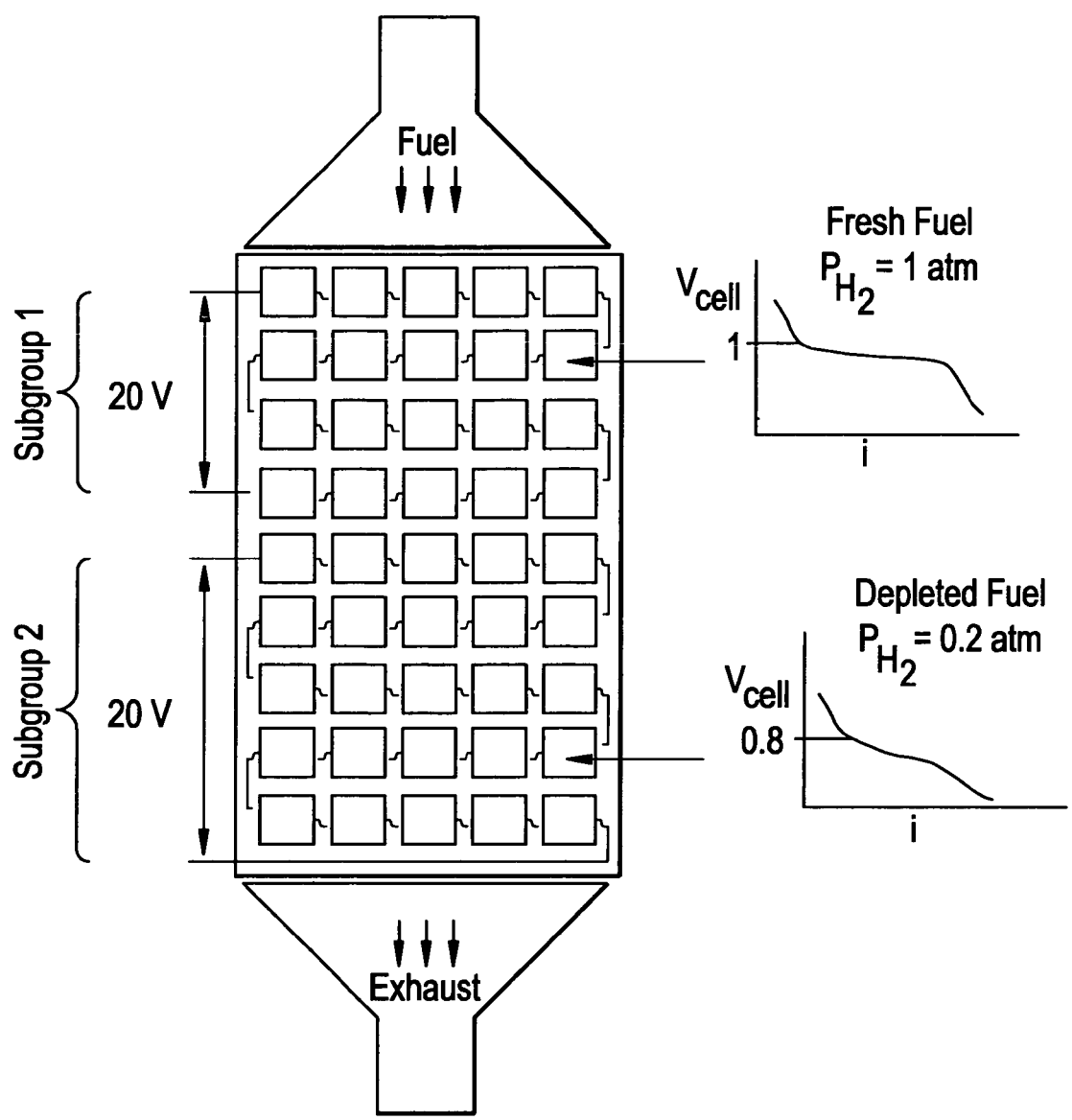
FIG. 24 illustrates another embodiment of the fuel cell device according to the present invention with multiple cells connected in voltage-matched series subgroups.

FIG. 24 illustrates another fuel cell device according to one embodiment of the present invention. This device utilizes the ability of the multiple cell, bipolar-plate-free fuel cell design approach is to advantageously tailor cell geometry and cell-to-cell interconnections to best meet specific design requirements. In this example, the cell to cell interconnections are used to best match the active cell area to local operating conditions. In this exemplary device, small fuel cells of equal area are connected in series in directions parallel and perpendicular to the gas flow to form a "series-connected subgroup." That is, each subgroup has a plurality of cells connected in series, and the different subgroups are connected in parallel. For a given operating current, the average voltage per cell will be determined by the local operating conditions, including temperature and fuel concentration. For typical operating conditions, the fuel cells located near the fuel inlet will have a higher average voltage due to the locally higher fuel concentration. The average voltage per cell and the number of cells in the subgroup will determine net subgroup voltage for a given load (current draw). A desirable design condition is to achieve similar net voltage output between subgroups connected in parallel—thus avoiding any inefficient internal currents due to voltage gradients between the subgroups. As schematically shown in FIG. 24, two subgroups of 20 V output each are achieved by connecting 20 fuel cells (first subgroup) operating at an average of 1 V/cell in the "fresh" fuel region, and connecting 25 fuel cells (second subgroup) operating at an average of 0.8 V/cell in the "depleted" fuel region. Note the active area present in the second subgroup is 25% larger than the active area of the first subgroup due to the larger number of cells in the second subgroup. Another way of looking at this design approach is to replace each subgroup of cells with one larger cell of equivalent active area, and then to inter connect these larger cells to one another.

In addition, though not shown in FIG. 24, it may be beneficial that within each subgroup there is a further "tuning" through variation of individual cell sizes such that the larger cells are, for example, located in the relatively depleted fuel regions. The two equipotential subgroups are connected in parallel.

Figure 25:
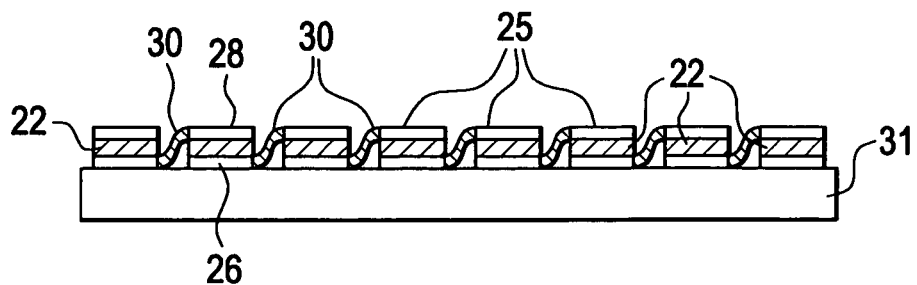
FIG. 25 is a schematic top view of a solid oxide fuel cell device of another embodiment of the present invention.
Figure 26:
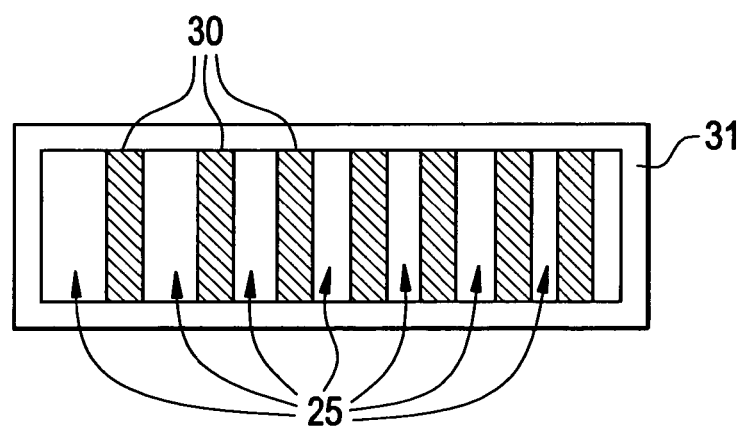
FIG. 26 is a schematic side view of a solid oxide fuel cell device of depicted in FIG. 25.

FIGS. 25 and 26 illustrate another embodiment of the solid oxide fuel cell device according to the present invention. This exemplary device includes at least one porous substrate 31 that supports a plurality of fuel cells 25. The electrodes (anodes) are applied or printed directly on the porous substrate. That is, each of the fuel cells comprise an anode 26 situated directly on the porous substrate, an electrolyte 22 situated on the anode, and a cathode 28 situated on and supported by the electrolyte 22. The fuel cells 25 are connected to one another by the interconnects 30, which in this example, are in the form of strips. The electrolytes 22 may be doped zirconias, bismuth oxide ($Bi_2O_3$), ceria ($CeO_2$), or gallates ($Ga_2O_3$). Such electrolyte compositions are known. As in the previous embodiments, the cells 25 have different sizes. Of course, the solid oxide fuel cell device may include a plurality of stacked porous substrates 31, with each substrate 31 supporting a plurality of fuel cells 25.

Figure 27:
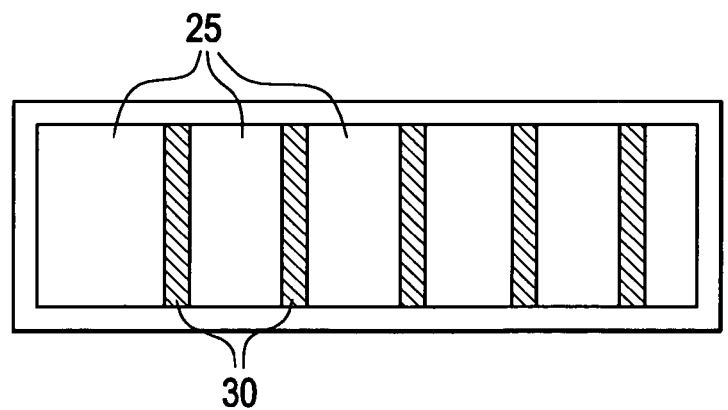
FIG. 27 is a schematic top view of a solid oxide fuel cell device of another embodiment of the present invention.

FIG. 27 illustrates another embodiment of the solid oxide fuel cell device according to the present invention. This exemplary device includes a plurality of fuel cells 25 connected by the interconnects 30. In this embodiment, the electrolytes 22 are self supporting electrolytes (i.e., they do not require to be supported by a substrate.) The electrolytes of this example are not flexible. As in the previously described examples, the electrodes are applied to opposing sides of each electrolyte, thus forming a plurality of fuel cells 25. The fuel cells 25 are connected series to one another by the interconnects 30, which in this example, are in the form of strips that run along side the cell length (or width). The electrolytes 22 may be zirconia based, bismuth oxide ($Bi_2O_3$) based, ceria ($CeO_2$) based, or may be gallate ($Ga_2O_3$) based. As in the previous embodiments, the cells 25 have different sizes.

Figure 28:
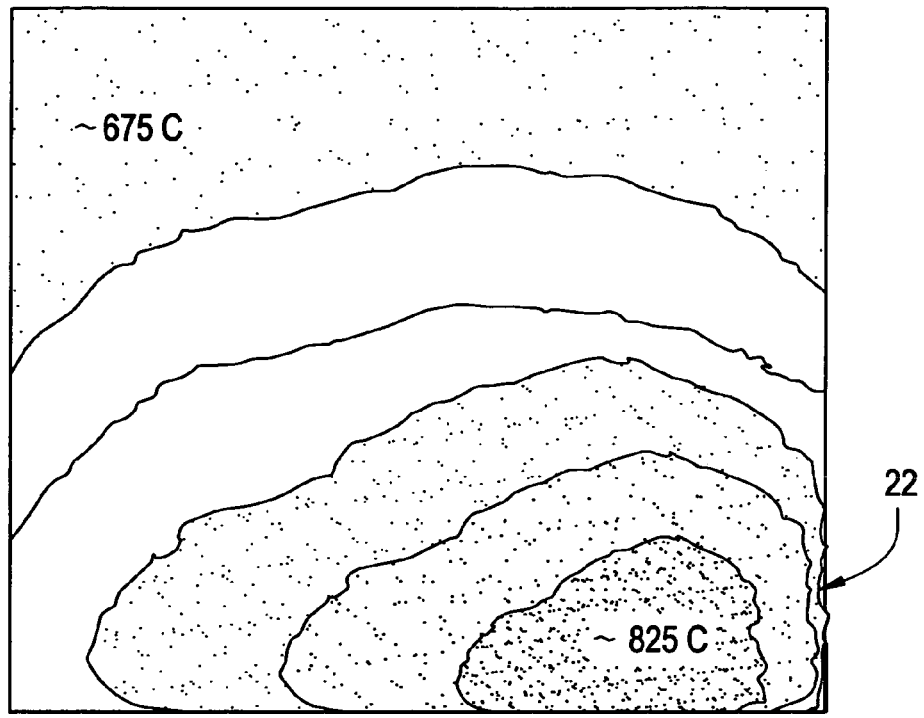
FIG. 28 is a schematic illustration of temperature distribution model utilized in conjunction with the fuel cell device illustrated in FIG. 30.
Figure 29:
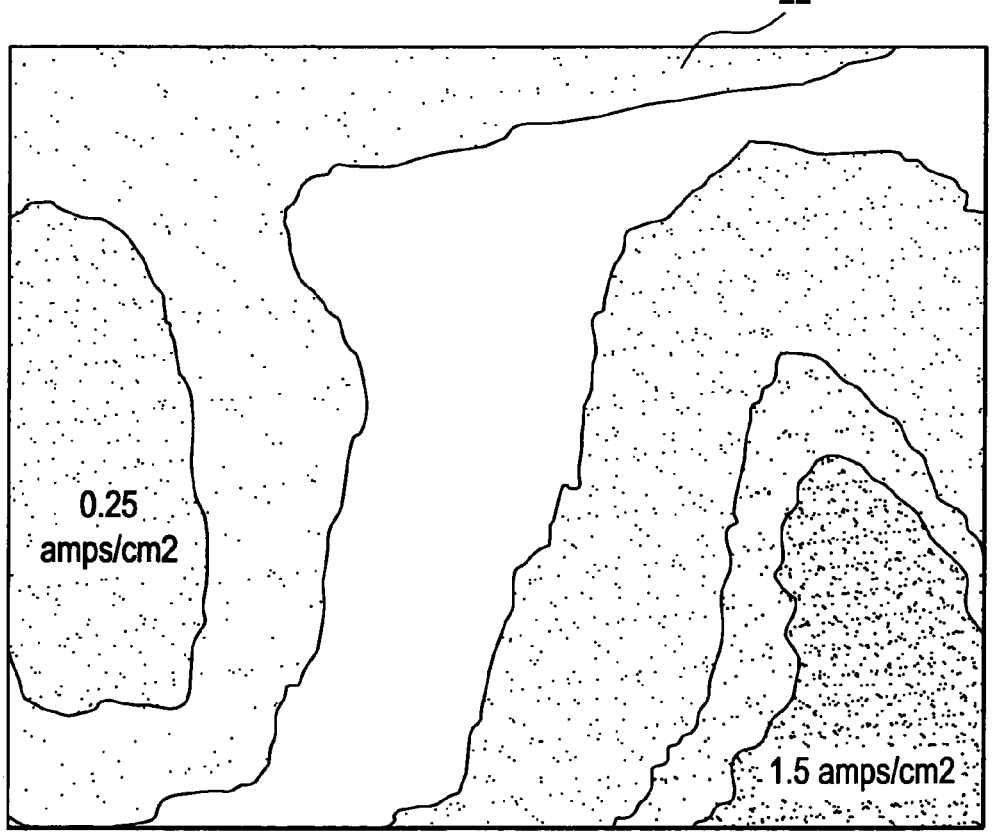
FIG. 29 is a schematic illustration of current density model utilized in conjunction with the fuel cell device illustrated in FIG. 30.
Figure 30:
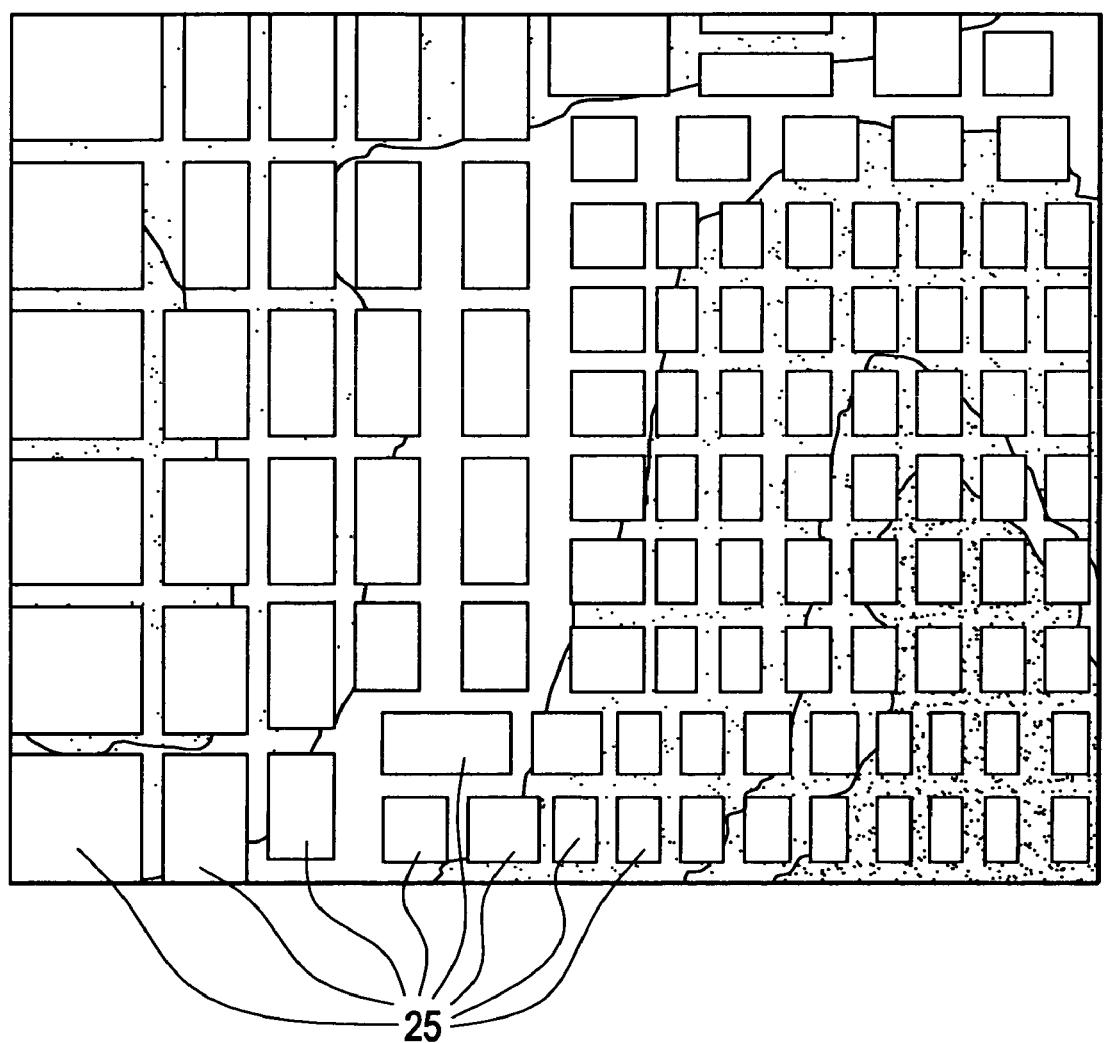
FIG. 30 is a schematic top view of a solid oxide fuel cell device of an embodiment of the present invention operating under the temperature distribution depicted in FIG. 28 and current densities depicted in FIG. 29.

FIG. 28 is a schematic illustration of the temperature distribution in a rectangular fuel cell device operating under cross flow operation. The thermal gradients are not uniform and create hotter areas on the down stream side of the air flow but the hotter areas are nearer the input of the fuel ($H_2$). FIG. 29 illustrates a schematic of the current density in a rectangular fuel cell sheet running with cross flow fuel ($H_2$) and oxidizer (air). The current density distribution becomes somewhat complicated due to the combination of both temperature and reactant concentration effects. The current density is shifted more to the inlet side of the fuel and the inlet side of the oxidizer. To achieve maximum power, the active area of the cells is divided into multiple areas producing about (within 10%) the same amount of power. FIG. 30 illustrates schematically the design of this fuel cell device. The fuel cell device includes multiple rectangular cells which subdivide the total active area into thirteen groups of fuel cells, according to current density distribution. Within each individual cells group, the fuel cells are connected in parallel, so that all the cells are at nearly equal potential (within 5% or 10%). Between the cell groups, the fuel cells are connected in series, for example, using precious metal vias. As the power produced by each group of fuel cells is fairly well matched (10% or less variability), the power derived from grouping the cells into 13 groups of different active areas can optimize the maximum total power.

If thermal management was desired, a different configuration of active area would be utilized. For example, if flattening the thermal gradients was the goal (isothermal operation), then a somewhat smaller total active area in the groups of cells in the cooler regions of the electrolyte sheet would be used to generate more heat. In the hotter regions, somewhat larger active area (for the groups of cells would generate less heat, when the active area of the groups of cells are compared to the active area for the maximum power case.

Figure 31:
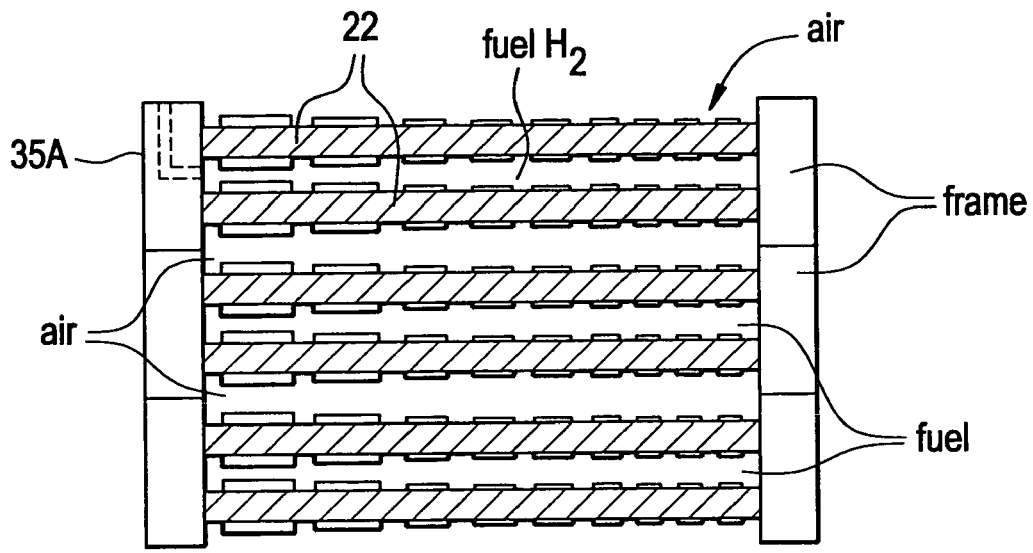
FIG. 31 is a schematic side view of a solid oxide fuel cell device of another embodiment of the present invention, which has a plurality of stacked electrolyte sheets and contains differently sized fuel cells.

As described above, a fuel cell device according to the present invention may include more than one electrolyte sheet 22, with each sheet forming one or more fuel cells 25. FIG. 31 illustrates an exemplary fuel cell device 20 having multiple electrolyte sheets 22. Each of the electrolyte sheets 22 supports a plurality of fuel cells 25. The fuel cells 25 have different sizes. In this embodiment each frame 32 supports two electrolyte sheets 22, such that the fuel cells of the two adjacent electrolyte sheets 22 are spaced from one another, forming a fuel cavity 34. The fuel cells 25 are oriented such that the anodes 26 of the two adjacent electrolyte sheets supported by the frame 32 face one another and the fuel cavity 34. The fuel (hydrogen gas) is provided into the cavity 34 by the fuel inlets 35A formed in the frame 34 and the "leftover" fuel is exhausted by outlets 35B situated at the opposite side of the frame 34. The cathodes 28 are facing outward, towards the fuel cells (cathodes) situated on the electrolyte sheet(s) supported by the adjacent frame. The air (oxygen) inlets 36A and the air outlets 36B are also situated within the frame(s) 32. It is noted that any of the above described exemplary fuel cell device configurations may be stacked to provide a fuel cell device that utilizes multiple electrolyte sheets.

Figure 32:
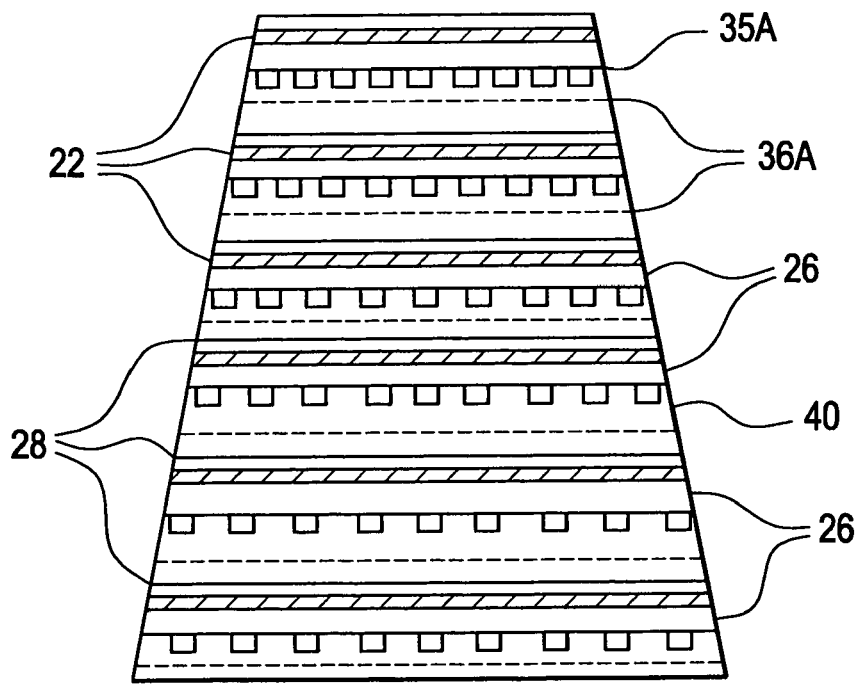
FIG. 32 is a schematic side view of a solid oxide fuel cell device of yet another embodiment of the present invention, which has a plurality of stacked electrolyte sheets and contains differently sized fuel cells.

A fuel cell device according to another embodiment of the present invention is shown schematically in FIG. 32. This exemplary device also utilizes more than one electrolyte sheet 22. However, in this embodiment each electrolyte sheet 22 corresponds to a single fuel cell. More specifically, this device includes six fuel cells 25 stacked on top of one another. A separator plate 40 (also referred to as a bipolar interconnect plate) separates the adjacent fuel cells 25. Each fuel cells 25 includes a relatively large anode 26 (400 μm thick) situated on the separator plate 40. The anode 26 forms a sheet or a plate and provides support for the electrolyte sheet 22. A thin (50 μm thick) cathode sheet 28 sits on top of the electrolyte sheet 22. The separator plates 40 includes fuel and air inlets 35A, 36A and fuel and air outlets 35B, 36B. In this example the fuel and air are cross-flowing. However, radial fuel/air flow may also be utilized. As in the previous example, this fuel cell device utilizes fuel cells of unequal sizes. However, because this device was designed to subject higher cells to higher temperatures, the top cells are smaller than the bottom cells.

It will be apparent to those skilled in the art that various modifications and variations can be made to the present invention without departing from the spirit and scope of the invention. For example, fuel cell devices with other configurations may also incorporate at least two fuel cells of unequal sizes. Varying area fuel cells may also be utilized in other fuel cell devices with other types of electrolyte membranes such as proton conductive polymer membranes commonly employed for Proton Exchange Membrane fuel cells.

Thus, it is intended that the present invention cover the modifications and variations of this invention provided they come within the scope of the appended claims and their equivalents.

What is claimed is:

1. A fuel cell device comprising:
   a plurality of fuel cells, each of said plurality of fuel cells having an active area, wherein at least two of the plurality of fuel cells have differently sized active areas, such that the ratio of the active areas of said at least two fuel cells is at least 1.1:1, wherein the maximum power of the fuel cell device is at least 5% greater than that of a fuel cell device with an equal total active area and equally sized cells and said electrolyte sheet contains at least 5 electrode pairs and the electrode pairs adjacent to at least one edge of said electrolyte sheet are larger than at least some of the electrode pairs located in the middle area of the electrolyte sheet.

2. The fuel cell device according to claim 1, wherein said plurality of cells include at least one electrolyte sheet and said electrolyte sheet is a zirconia based electrolyte sheet.

3. The fuel cell device according to claim 1, wherein said ratio is at least 1.2:1.

4. The fuel cell device according to claim 1, wherein said ratio is at least 1.5:1.

5. A fuel cell device comprising:
   (i) at least one electrolyte sheet;
   (ii) a plurality of electrode pairs arranged on opposing sides of the electrolyte sheet, each of the electrode pairs including an anode and a cathode, wherein (a) at least two of the plurality of electrode pairs are of different size, such that area ratio between at least two of the plurality of electrode pairs is at least 1.1:1, and (b) the electrode pairs adjacent to at least one edge of the electrolyte sheet are larger than at least some of the electrode pairs located in the middle area of the electrolyte sheet.

6. The fuel cell device according to claim 5, wherein said ratio is at least 1.2:1.

7. The fuel cell device according to claim 5, wherein said at least one electrolyte sheet is a zirconia based electrolyte sheet.

8. The fuel cell device according to claim 5, wherein said ratio is at least 1.5:1.

9. The fuel cell device according to claim 5, wherein said at least one electrolyte sheet is at least partially stabilized zirconia.

10. The fuel cell device according to claim 5, wherein said electrolyte sheet is a flexible sheet of at least partially stabilized zirconia.

11. A fuel cell device comprising:
    (i) at least one electrolyte sheet;
    (ii) a plurality of electrode pairs arranged on opposing sides of the electrolyte sheet, each of the electrode pairs including an anode and a cathode, wherein at least two of the plurality of electrode pairs are of different size, such that area ratio between at least two of the plurality of electrode pairs is at least 1.1:1, wherein said at least one electrolyte sheet contains at least 5 electrode pairs and the electrode pairs adjacent to at least one edge of the electrolyte sheet are larger than at least some of the electrode pairs located in the middle area of the electrolyte sheet.

12. A fuel cell device comprising:
    (i) at least one electrolyte sheet;
    (ii) a plurality of electrode pairs arranged on opposing sides of the electrolyte sheet, each of the electrode pairs including an anode and a cathode, wherein (a) at least two of the plurality of electrode pairs are of different size, such that area ratio between at least two of the plurality of electrode pairs is at least 1.2:1, and (b) wherein said electrolyte sheet contains at least 5 electrode pairs and the electrode pairs adjacent to the edges of said electrolyte sheet are larger than at least some of the electrode pairs located in the middle area of the electrolyte sheet.

13. The fuel cell device according to claim 1, wherein the maximum power of the fuel cell device is at least 5% greater than that of a fuel cell device with an equal total active area and equally sized cells.

14. The fuel cell device according to claim 1, wherein the maximum power of the fuel cell device is at least 10% greater than that of a fuel cell device with an equal total active area and equally sized cells.

15. A fuel cell device comprising:
    at least two sets of fuel cells, each set containing a plurality of fuel cells, wherein the two sets of fuel cells have different active areas, such that ratio of the active areas of said at least two sets of fuel cells is at least 1.1:1, wherein the maximum power of the fuel cell device is at least 5% greater than that of a fuel cell device with an equal total active area and equally sized cells and electrode pairs adjacent to at least one edge of the fuel cell device are larger than at least some of the electrode pairs located in the middle area of the fuel cell device.

16. The fuel cell device according to claim 15, wherein said at least two sets of fuel cells are connected in parallel.

17. The fuel cell device according to claim 15, wherein said at least two sets of fuel cells are connected in series.

18. The fuel cell device according to claim 15, wherein the cells within each of the at least two sets of fuel cells are connected in series.

19. The fuel cell device according to claim 5, wherein said electrolyte sheet contains at least 5 electrode pairs and the electrode pairs adjacent to the edges of said electrolyte sheet are larger than at least some of the electrode pairs located in the middle area of the electrolyte sheet.

20. The fuel cell device according to claim 15 wherein said plurality of cells include at least one electrolyte sheet and said electrolyte sheet is a zirconia based electrolyte sheet.

* * * * *